United States Patent [19]

Weissberger et al.

[11] 4,171,537

[45] Oct. 16, 1979

[54] NUMBER ORIENTED PROCESSOR

[75] Inventors: Alan J. Weissberger, Santa Clara; Ted W. Toal, Sunnyvale, both of Calif.

[73] Assignee: National Semiconductor, Santa Clara, Calif.

[21] Appl. No.: 868,101

[22] Filed: Jan. 9, 1978

[51] Int. Cl.² .......................... G06F 7/38; G06F 15/06
[52] U.S. Cl. .................................. 364/704; 364/200; 364/706
[58] Field of Search ............... 364/706, 709, 704, 200

[56] References Cited
U.S. PATENT DOCUMENTS

| | | | |
|---|---|---|---|
| 3,462,741 | 8/1969 | Bush et al. | 364/704 X |
| 3,812,470 | 5/1974 | Murtha et al. | 364/726 X |
| 3,971,925 | 7/1976 | Wenninger et al. | 364/709 X |
| 4,063,221 | 12/1977 | Watson et al. | 364/706 X |

*Primary Examiner*—Jerry Smith
*Attorney, Agent, or Firm*—Harry M. Weiss

[57] ABSTRACT

An MOS/LSI Number Oriented Processor is provided which is intended for number processing applications. The single chip device provides arithmetic, logarithmic and transcendental functions, test and branch capability, internal number storage and input/output capability. The Number Oriented Processor uses ROM library means to store routines for performing the required functions. The desired function is selected from the library by macro instruction means from an external ROM, RAM or microprocessor. The Number Oriented Processor can be used as a stand-alone processor with external ROM/PROM (or RAM) and program counter; or, it can be configured as a peripheral device on the bus of a microprocessor or minicomputer.

9 Claims, 33 Drawing Figures

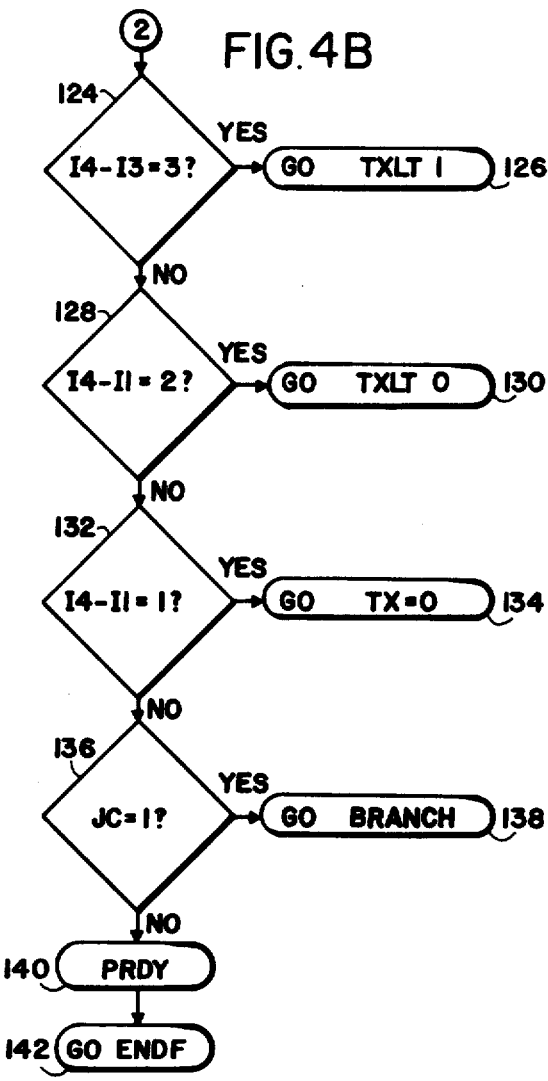

NUMBER ORIENTED PROCESSOR

BACKGROUND OF THE INVENTION

A. Field of the Invention

This invention relates to data processors, and more specifically to number processors. It particularly relates to the use of a specifically designed microprocessor device containing a stored microprogram for number processing tasks including arithmetic, trigonometric, logarithmic and other functions involving numeric data.

B. Description of Prior Art

Computers, calculators and microprocessors have long been used to process numeric data. In a typical application, software is written using the computer or microprocessor's unique instruction set to implement the complex mathematical routines required. Input/output routines are written to handle the entry, transfer and output of numeric data. Electronic calculator devices may be considered very specialized cases of the microprocessor device where the input/output routines and the hardware are optimized for use with keyswitch entry and display or numeric printer output.

In more sophisticated computers and mini-computers, hardware modules are sometimes added to perform certain arithmetic or special calculations. In this case, a typical system might implement a floating point add, subtract, multiply and divide capability using a multiplicity of integrated circuit logic elements. These hardware additions are usually specifically designed for a particular machine and tend to be quite expensive in comparison to other system hardware and their major function is to increase the operating speed of the arithmetic processing operations.

Since the cost of implementing even floating point arithmetic capability to a system is quite high with a strictly hardware approach, a more versatile and less costly system was needed. To be cost effective it was desirable that the system be compatible with a wide variety of systems, both stand-alone and computer or microprocessor controlled. It was also considered desirable that the number processing system be implemented on a single integrated circuit chip for economy and contain resident software library routines for control and for performing arithmetic, logarithmic and transcendental calculations on numeric data in floating point or scientific format.

SUMMARY OF THE INVENTION

Accordingly, it is the object of this invention to provide a system with integral software library means and control function means for number processing applications.

It is a further object of this invention to provide a system for number processing applications compatible with microprocessor or mini-computer data bus control.

It is a still further object of this invention to provide a system for number processing applications compatible with stand-alone control systems.

It is a still further object of this invention to provide a pre-programmed number processing system with capability to perform arithmetic, logarithmic and transcendental functions.

It is a still further object of this invention to provide a number oriented processing system on a single MOS/LSI integrated circuit chip.

DESCRIPTION OF THE PREFERRED EMBODIMENT

Figure 1A:
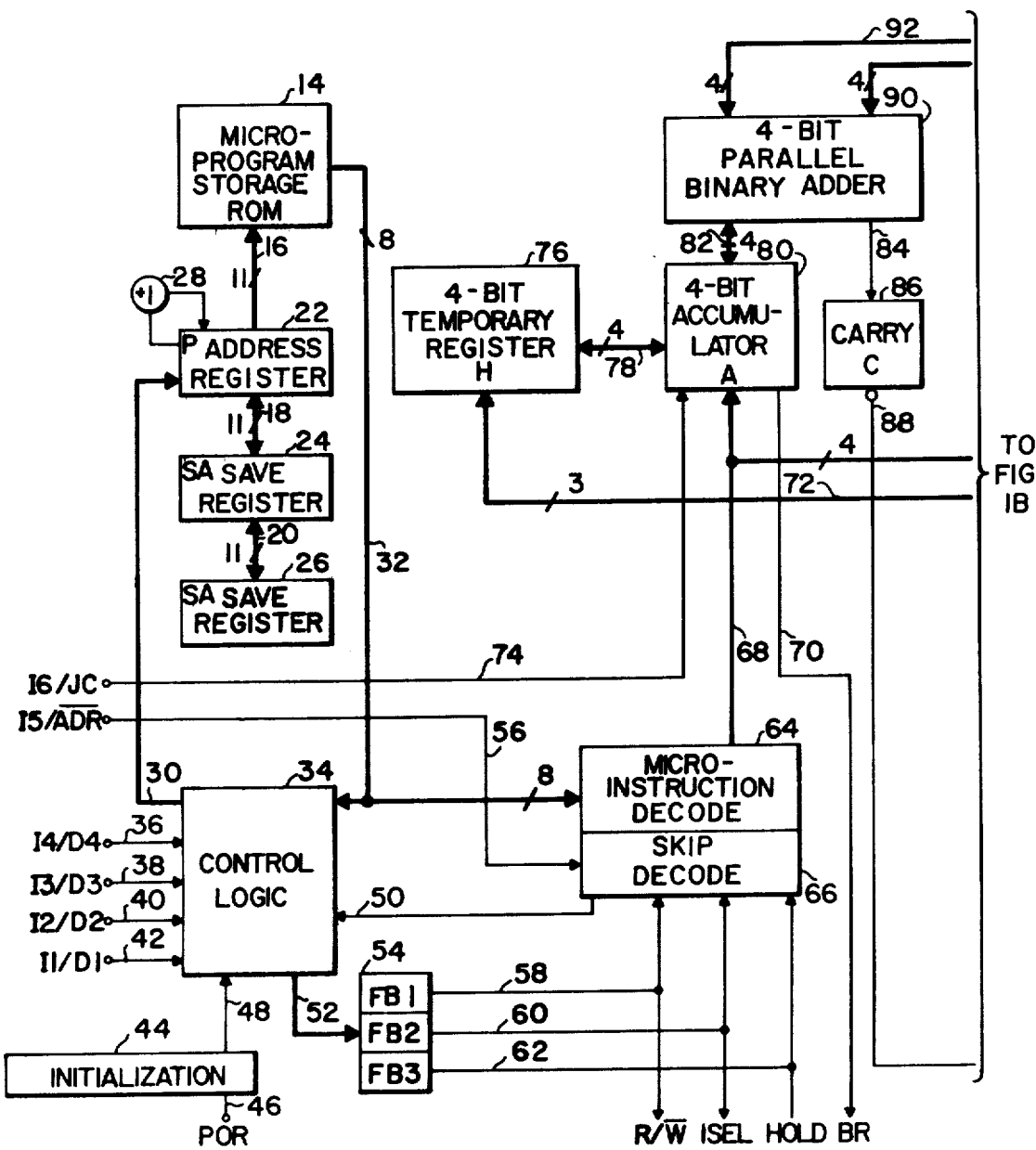
FIGS. 1A and 1B are a block diagram of the Number Oriented Processor showing internal structure as well as input and output leads to the single integrated circuit chip.
Figure 1B:
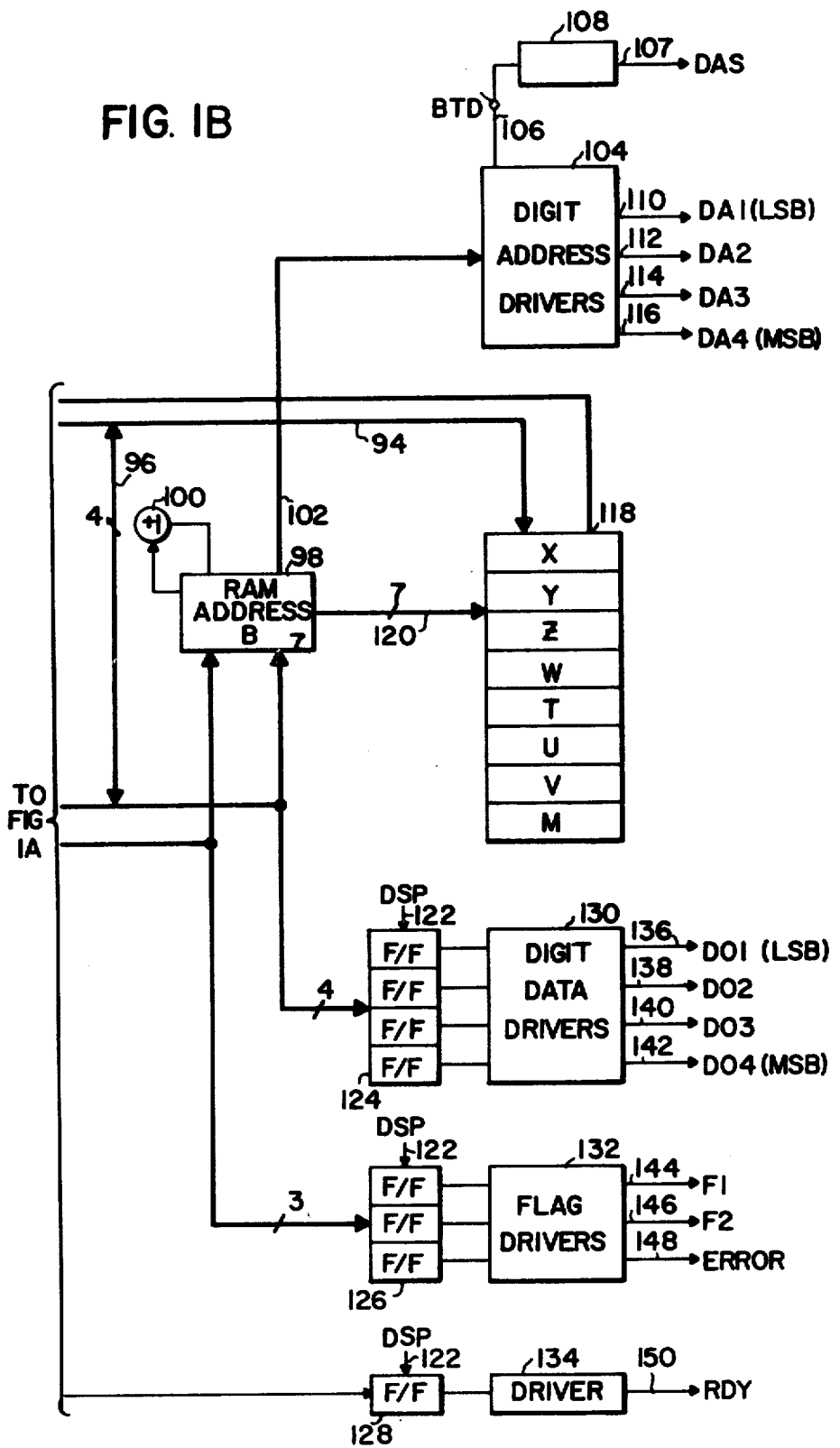

The Number Oriented Processor is intended for number processing applications, either as a microprocessor peripheral chip or as a stand-alone processor. FIGS. 1A and 1B show a functional block diagram illustrating the internal organization of the number oriented processor and the origin or destination of the signal lines that are used to communicate with the external world.

The Number Oriented Processor operates on a 9 V power supply between VSS 10 and VDD 12. In order to make it TTL compatible, it can be operated from supplies of 5 V and −4 V. The signal inputs are designed to respond properly to TTL logic levels (with the exception of HOLD 62 and POR 46) when the device is operated in this fashion.

A 400 kHz oscillator operating between VSS and VSS −5 V is required at OSC 152. The rise and fall times and frequency of this oscillator are not critical, making it relatively easy to generate. The Number Oriented Processor provides a SYNC 154 output, which is a signal that goes active low once every 4 oscillator cycles. A single SYNC pulse corresponds to a single "microcycle" (about 10 μs) and has the same frequency as internal clock cycles $\phi1$, $\phi2$, $\phi3$ and $\phi4$. The execution of a single Number Oriented Processor MACRO instruction from its library involves thousands of microcycles. U.S. Pat. No. to T. W. Toal, et al, 4,051,605, Col. 7, 8, 9 and 10 show details of the microinstruction set used by the Number Oriented Processor.

The processor is reset by applying VSS volts to the POR 46 input and then setting it to VDD volts. The chip will then set the various outputs to their proper levels and generate 3 pulses on the ready line RDY 150. These ready pulses are designed to provide for automatic processing of an error in stand-alone systems. A microprocessor system would ignore the first 2 pulses on RDY 150 and use the third one as a "Ready for Instruction" signal.

The Number Oriented Processor has 6 instruction inputs ($I_6$-$I_1$, numbered 74, 56, 36, 38, 40 and 42 respectively) which are used to provide it with a 6 bit instruction code (commonly referred to as an "op code"). This op code corresponds to one of the Number Oriented Processor's MACRO instructions in its library. A list of the Number Oriented Processor's MACRO instructions and their operation is shown in Appendix I. The 6 instruction lines are shared by 6 data lines. The output ISEL 60 identifies which function the 6 lines are performing. When ISEL=1, the 6 lines are instruction lines ($I_6$-$I_1$). When ISEL=0, the 6 lines are data lines (JC 74, ADR 56, D4-D1, 36, 38, 40 and 42 respectively). In many cases, the data lines, which are associated with the IN, AIN, and TJC instructions, will not be used. In these instances ISEL 60 can be ignored. If the data lines are used, ISEL 60 is the select input for six external 2-1 multiplexers or an enable input to external buffers, latches or ROMs.

A ready output (RDY 150) goes high when the processor is ready to read a 6 bit instruction code. This output operates in conjunction with the HOLD 62 input. When RDY 150 goes high, it will remain high if HOLD=1. If processor instructions are not always ready when RDY 150 goes high, some method must be provided to set HOLD=1. A microprocessor might have a flag output which holds HOLD=1 until it is ready to pass an instruction to the Number Oriented Processor. (If instructions are always ready when RDY goes high, the HOLD 62 input can be tied to "0".) After RDY 150 goes high, it will wait for HOLD=0 and then go low again. At this time the 6 bit instruction code is read and the MACRO instruction is performed.

The branch output ($\overline{BR}$ 70) provides a 4 microcycle active low pulse which signals that the result of a test instruction was true. This pulse starts prior to RDY=1 for the next instruction, and ends slightly after RDY=1.

The 3 signals RDY 150, HOLD 62, and ISEL 60 were carefully chosen to allow the Number Oriented Processor to be used as a stand-alone processor or as a microprocessor peripheral. In a stand-alone system, RDY 150 would be a clock for an external program counter whose outputs would address a ROM containing the Number Oriented Processor MACRO instructions. $\overline{BR}$ 70 would parallel load the external program counter, resulting in a program branch. In a microprocessor system, RDY 150 would inform the microprocessor that the processor is ready for a new instruction. HOLD 62 would be used to give the microprocessor time to respond to the Number Oriented Processor.

As shown in FIGS. 1A and 1B, the chip has an internal register file RAM 118. Each of 5 registers (X, T, U, V and M) has 8 mantissa digits, 2 exponent digits, a decimal point position indicator and mantissa and exponent sign bits. MACRO instructions operate on these registers. The MACRO instructions IN and OUT input and output numbers to and from the X register. There are 2 possible modes of operation for IN and OUT instructions. Floating point mode transfers mantissa digits, a mantissa sign digit and a decimal point position digit. Scientific notation mode transfers mantissa digits, 2 exponent digits, a digit containing mantissa and exponent sign bits, and a decimal point position indicator. Initially the Number Oriented Processor is in the floating point mode. The TOGM instruction toggles to the opposite mode. The number of mantissa digits input or output by an IN or OUT instruction is equal to the mantissa digit count (MDC). The MDC is initially 8 and can be set to any value from 1 to 8 using the SMDC instruction. When an IN or OUT instruction is executed, the four DA outputs 110, 112, 114 and 116 will sequence through values indicating which digit is to be input or output. During an OUT instruction, the four DO outputs provide the digit outputs, coded in BCD. The R/$\overline{W}$ 58 output is pulsed active low once for each digit. This R/$\overline{W}$ pulse can be used to write the data into an external RAM or clock it into a latch. During an IN instruction, the four I lines (I$_4$-I$_1$) 36, 38, 40 and 42, are data input lines for the digits to be input and so are also named D4-D1. The same data format is used for IN as is used for OUT. The $\overline{DAS}$ 107 output is pulsed active low prior to reading each digit. This $\overline{DAS}$ pulse can be used as a data request signal to clock data into a latch.

The digit address on the DA lines 110, 112, 114 and 116 is valid on the positive-going edge of the $\overline{DAS}$ pulse.

The IN and OUT instructions have been designed to allow easy expansion of the internal register file. An external 256×4 RAM will add an additional 16 registers for data storage. The DA lines 110, 112, 114 and 116 are used to provide part of the RAM address. The rest of the address, which would specify one of the 16 registers, comes from the external instruction storage (ROM, microprocessor, etc.). The DO lines 136, 138, 140 and 142 are the input to the RAM, while the RAM outputs are multiplexed to the I lines, using ISEL 60 to select between instructions and data. The processor R/$\overline{W}$ line 58 is the RAM R/$\overline{W}$ signal.

There are three ways to input data to the Number Oriented Processor. The first is the IN instruction which has already been described. Second is the AIN instruction, which inputs a single digit into the X register 118. Multiple AIN instructions will input more than one digit to the X register 118, since the AIN instruction does not cause termination of the number entry mode. The DA lines 110, 112, 114 and 116 provide a digit address from $0_8$ to $7_8$ for multiple AIN instructions. The $\overline{ADR}$ input 56 (shared with I$_6$) is a data hold signal for AIN. If $\overline{ADR}$ 56 is high during an AIN instruction, the processor will wait until it goes low, and then read the digit on D4-D1 (36, 38, 40 and 42). Finally, the F2 output 146 of the Number Oriented Processor will be pulsed active low as a read acknowledge signal.

For systems using a microprocessor with the Number Oriented Processor as a peripheral, it is unlikely that the IN nor the AIN instruction would be used. Instead, the third method of inputting data to the processor would be used. This method involves entering numbers as instructions. There are "0", "1", "2", ... "9" instructions, a decimal point instruction, etc. A number can be entered directly into the Number Oriented Processor by selecting these MACRO instructions in the same manner as keys are selected (pressed) to enter numbers into a calculator.

Several MACRO instructions have conditions which will cause an error to occur. When an error does occur, the Number Oriented Processor will set the ERROR output 148 high. This output can be tested with the TERR instruction and cleared with the ECLR instruction.

The 2 outputs F1 144 and F2 146 are flags which are set by the instructions SF1 and SF2. They can also be pulsed active high with the instructions PF1 and PF2. These flag outputs can be used as single bit outputs from the Number Oriented Processor.

A TJC instruction will branch (i.e. result in a true condition causing a $\overline{BR}$ pulse) if the input JC 74 is high. Otherwise the TJC instruction will do nothing.

Several instructions are 2 word instructions, of which there are 4 types. Each type generates two RDY pulses, one for each word. The first type are the inverse instructions (inverse SIN, COS, TAN and inverse +, −, × and / for memory operations). These instructions require that the INV MACRO instruction first be executed, followed by the desired instruction (SIN, COS, etc.). The second type is the SMDC instruction. The second word of this instruction is the mantissa digit count, a BCD number 1 to 8. The third type is the IN and OUT instructions. The second word of these instructions is the register number (i.e. the high order address for a RAM) or possibly a device select code. It is not necessary to use the second word of these instructions because the Number Oriented Processor ignores it, providing only a RDY pulse that may or may not be used by external hardware. The final type of 2 word instructions are the branch instructions. The second word of these instructions is intended to be a branch address to be loaded into an external program counter in stand-alone systems. For a microprocessor system, the second RDY pulse can be used to clock the BR output 70 into a latch. The latch can then be tested to discover if the branch condition was true ($\overline{BR}=0$) or false ($\overline{BR}=1$).

Referring to FIGS. 1A and 1B the Number Oriented Processor comprises sections for program storage, control instruction decoding, an arithmetic logic unit, RAM register storage and input/output sections.

The operating and library programs for the Number Oriented Processor are stored in microprogram storage ROM 14. This read-only memory storage section provides operating micro-instructions to the microprocessor via eight line bus 32 to micro-instruction decode 64 and to control logic section 34. All program library sequences for mathmatical operations and input/output are stored in the microprogram storage ROM 14. The sequence of execution of these instructions is controlled by address register 22, designated the "P" register for convenience. The address register 22 is an 11 bit register, used as a program location counter, which may be set to a value, incremented to a new value or reset to a known starting value. The incrementing function is designated by +1 incrementor 28 while the other control functions of P 22 are provided by data bus 30 from the control logic section 34. The output of the address register 22 drives the address lines of the microprogram storage ROM 14 via 11 bit data bus 16. Thus the sequence of instructions represented by the data in specific word addresses in the microprogram storage ROM 14 may be controlled directly by the address register 22. Two save registers SA 24 and SB 26 are used to store the return address locations when subroutine calls are implemented. When a subroutine is called, the value in the address register 22 is incremented by one and written into the SA save register 24 via 11 bit bus 18. At the same time the contents of the SA save register 24 is written into the SB save register 26 via 11 bit bus 20. When a return from a subroutine is executed, the contents of the SA save register 24 replace the contents of the P address register 22. The contents of the SB save register 26 replace the contents of the SA save register 24; thus, the hardware of the Number Oriented Processor provides up to two levels of hardware controlled subroutine nesting. Initialization means 44 is used to provide proper start up conditions for the processor. When the POR input 46 is taken high, the control logic 34 causes the address register 22 to be reset to a predetermined address. This insures a known starting point for the software program allowing initializing means to be implemented which performs such tasks as clearing registers and setting up input and output drivers in the proper states for operation.

As well as providing control for program execution and initialization, the control logic section 34 accepts external information via 4 combination instruction and data lines 36, 38, 40 and 42. It provides control outputs R/$\overline{W}$ 58, ISEL 60 and HOLD 62. These outputs are driven from the control logic section 34 via data bus 52 and are buffered by output buffers 54 FB1, FB2 and FB3. The same outputs are also driven into skip decode section 66. These three control outputs R/$\overline{W}$ 58, ISEL 60 and HOLD 62 are extremely important in communicating with the microprocessor or stand-alone control system which uses the Number Oriented Processor. Their operation has been explained earlier in this discussion as it applies to external control.

Microinstruction decode 64 receives microinstructions from the microprogram storage ROM 14 via the 8 bit data bus 32. The microinstruction decode 64 interprets the microinstruction supplied from the ROM 14 and takes appropriate action to implement that particular microinstruction. Data is fed to the control logic 34 and/or other portions of the system to implement the required operation. The skip decode section 66 receives external inputs such as R/$\overline{W}$ 58, ISEL 60 and HOLD 62 as well as instruction/control line I5/$\overline{ADR}$ 56 and provides an output line 50 to the control logic section 34. The purpose of the skip decode section 66 is to inform the control logic section when the next program address in the sequence is to be skipped. The control logic section 34 implements this request by incrementing the program address register 22 twice via the incrementer 28. There are many different conditions which require skipping instructions such as tests made within the program structure and external control requests.

The calculating functions within the microprocessor are performed by four bit parallel binary adder 90, four bit accumulator 80, four bit temporary register 76, carry logic section 86 and random access memory register file 118. The binary adder 90 performs the four bit addition of two binary numbers, one of which is resident in the four bit accumulator 80 and the other of which is resident in the random access memory register file 118. Communication between the four bit accumulator 80 and the binary adder 90 is via four line data bus 82. Transfer of data from the RAM memory register file 118 is provided to the binary adder 90 via four bit data bus 92. The result of the calculation is placed in the four bit accumulator 80. Carries from bit to bit are handled within the binary adder 90 while a carry out (overflow) of the fourth bit is propagated through line 84 to the carry logic section 86. The output of this carry logic section 86 is transferred through line 88 to storage flip-flop 128 and subsequently through driver 134 to the output line RDY 150. Data is latched into the flip-flop 128 when the DSPA instruction is executed.

The combination instruction and jump control line I6/JC 74 is coupled into the most significant bit of the accumulator 80. This line is used to input the most significant bit of the 6 bit MACRO instruction code when ISEL=1, and is used to force a jump to a specified address when the TJC MACRO instruction is applied. The branch output line $\overline{BR}$ 70 is coupled out of the least significant bit of the accumulator 80. Input from I6/JC 74 and output to $\overline{BR}$ 70 occurs when the AXO microinstruction is executed.

The RAM register file 118 contains 8 registers of 12 words, where each word contains 4 bits. The registers are designated X, Y, Z, W, T, U, V and M for reference in the flow chart (FIGS. 2-24). Registers X, T, U, V and M are accessable to the user of the Number Oriented Processor while registers Y, Z and W are used for internal storage and data manipulation. Referring to Appendix I, the references to user registers X, Y, Z, T and M correspond to internal registers X, T, U, V and M respectively.

In the instant invention (using the internal register designations) the X and Y registers are used for working storage and I/O operations. The Z register is used to hold the operand of an add, subtract, multiply or divide operation. The W register is used for intermediate storage in register transfer and swapping operations. Three digits in each of the Z and W registers are used for storage of flags and indicators used by the microprogram library. Registers X, Y, T, U, V and M contain 8 mantissa digits, 2 exponent digits, a decimal point position digit, and a digit containing bits designated to represent the mantissa and exponent signs.

The particular register and digit selected for processing is addressed by RAM address register 98, designated B for convenience in reference. The B register 98 contains 7 bits and is divided into two sections. The least significant (lower) 4 bits ($B_d$) are used to select one of 12 digits in a register while the most significant (upper) 3 bits ($B_r$) are used to select a register in the RAM register file 118. The lower 4 bit section, $B_d$, may be incremented or decremented by incrementer/decrementer 100. The B register 98 may be loaded from the ROM 14, A 80 or H 76.

Digit data drivers 130 buffers the 4 bit data output from the accumulator 80 to the data output lines DO1 to DO4 (136, 138, 140 and 142) respectively). The data from A 80 is stored in four latches 124 when the decoded microinstruction DSP 122 is executed. Data is presented in Binary Coded Decimal format with DO4 142 being the most significant bit. The value of each digit of the result of a calculation may be output on these lines.

Digit address drivers 104 buffer the data from the least significant 4 bits ($B_d$) of the RAM address register B 98 to the digit position lines DA1 to DA4 (110, 112, 114 and 116 respectively). The data is latched and presented in buffered form to the outputs when the decoded microinstruction BTD is executed. BTD is also buffered in buffer 108 and drives output $\overline{\text{DAS}}$ 107. The output $\overline{\text{DAS}}$ 107 may be used to clock digit data information into an external register or RAM in the position being designated by the digit address. The DA4 output 116 is the most significant bit of the digit address data. The digit address data is presented in binary format and represents the relative position of the BCD digit presently being output by the digit data drivers 130.

The 3 least significant bits of the H register 76 may be transferred to flag outputs F1 144, F2 146 and ERROR 148. The least significant bit of H 76 is output to ERROR 148 with the second and third bits going to F2 146 and F1 144 respectively. The data from H 76 is transferred to latches 126 for presentation to the flag drivers 132 when the decoded microinstruction DSP 122 is executed.

Clock generator 156 provides internal clock phases $\phi1$ 158, $\phi2$ 160, $\phi3$ 162 and $\phi4$ 164 for timing and sequencing internal operations. The clock phases are generated from OSC 152 input signal discussed previously. The SYNC 154 output is generated in the clock generator section 156 by counting four external clock cycles. It may be used to time external logic or systems to the Nuber Oriented Processor's microinstruction cycle.

Figure 2A:
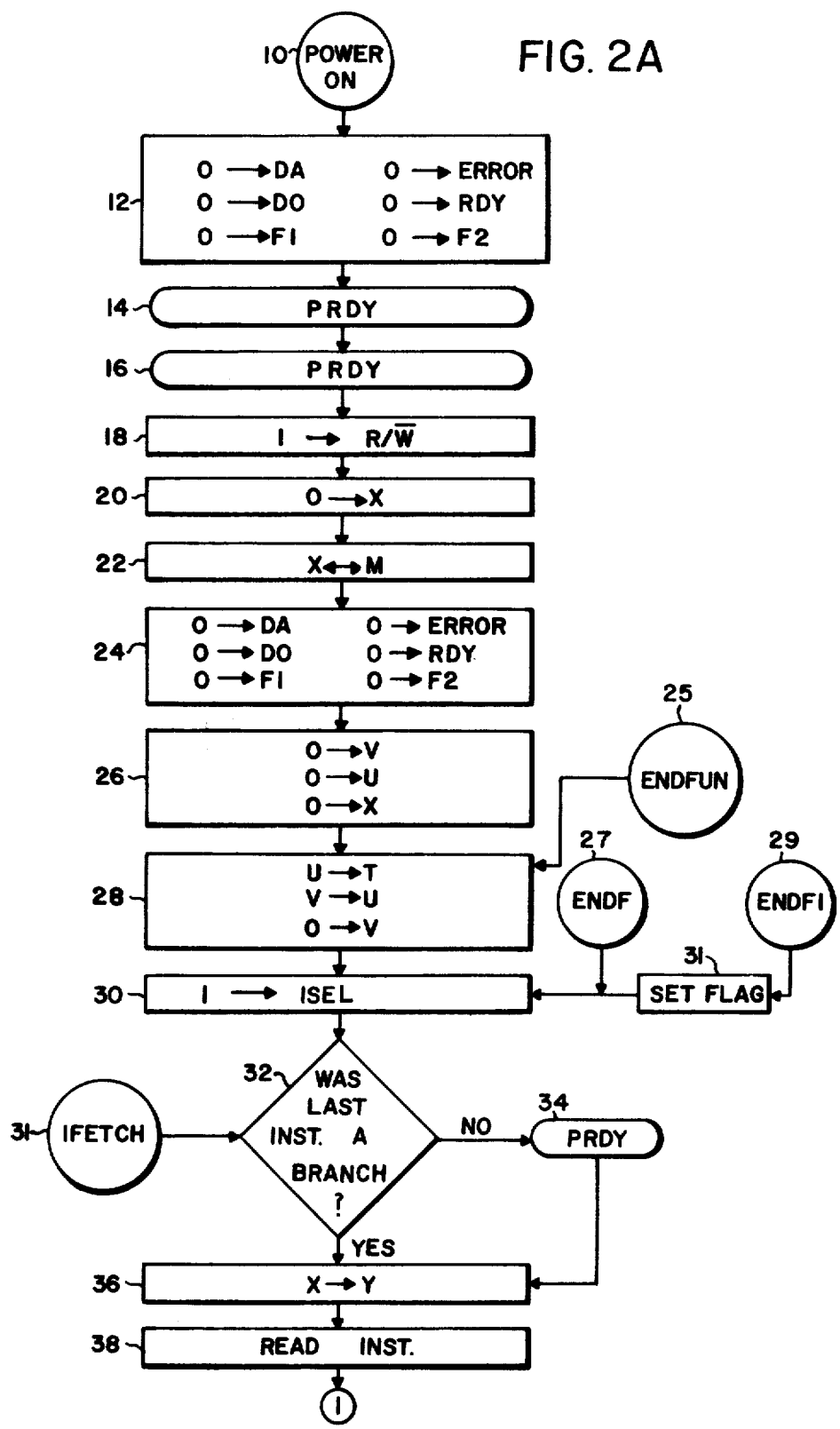
FIGS. 2A-27 are flow charts of the microinstructions necessary to enable the Number Oriented Processor to interface with external controllers, select and process macro instruction requests for library functions, and input or output data.

Referring to FIG. 2A, the control and library program of the Number Oriented Processor is initialized to start at block 10 (POWER ON) by the initial application of supply voltage to the chip or when a logic 1 is applied to the POR input (see FIG. 18). The initial operation performed by the Number Oriented Processor is to clear the outputs DA, DO, F1, F2, RDY and ERROR to zero in block 12. In blocks 14 and 16 the PRDY subroutine causes the RDY output (line 150, FIG. 1B) to be pulsed low. In block 18, a 1 is written into the R/$\overline{\text{W}}$ buffer. The X register is set to zero in block 20, then in block 22, the contents of X is exchanged with the contents of the M register. Block 24 again clears outputs DA, DO, F1 F2, RDY and ERROR to zero. Next, registers V, U and X are set to zero in block 26; then, in block 28, register U is transferred to T, register V is transferred to U and a zero is transferred into register V. Block 25, ENDFUN, is an entry point to block 28 used in other parts of the program to end certain functions. ENDF in block 27 is also an end of function path which enters block 30. EDF1 entry is used for end of function when a BRANCH has been executed. A flag is set in block 31 which is checked in block 32 to determine if the last instruction was a BRANCH. Next the ISEL output is set to a logic 1 indicating the Number Oriented Processor is ready to receive a MACRO instruction input on lines I1-I6. Decision block 32 checks to see if the last instruction executed was a BRANCH. This block may be entered from block 30 or from block 31 via IFETCH. If the instruction was not a BRANCH instruction, block 34 is executed and the RDY line is pushed low. If the last instruction was a BRANCH, the X register is written into the Y register in block 36. In block 38 the Number Oriented Processor reads the next instruction present on line I1-I6.

Figure 2B:
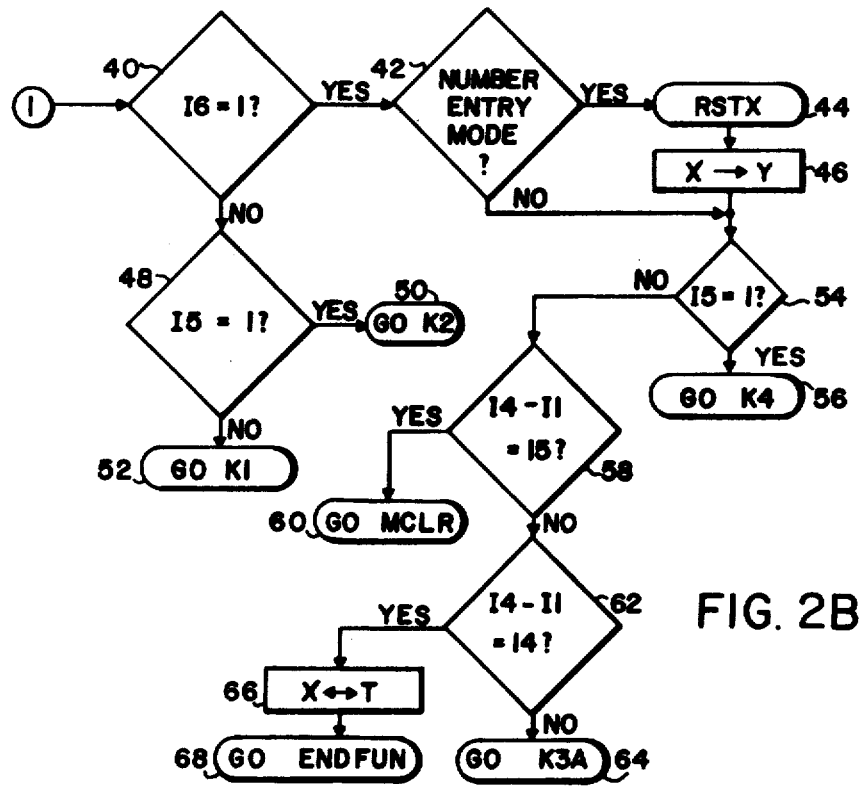

Referring to FIG. 2B, decision block 40 checks for I6=1. If I6 is not equal to 1 the program proceeds to decision block 48 and I5 is checked for equality to 1. If I5=1 the program proceeds to block 50 and subsequently goes to K2 which will be discussed in more detail later when FIG. 4A is discussed. If I5 is not equal to 1, the program proceeds to block 52 and goes to K1 on FIG. 3, which will be discussed in more detail later. If I6 equals 1, decision block 42 is executed next. This block checks to see if the Number Oriented Processor is in the number entry mode.

If it is in the number entry mode, block 44 terminates the number entry mode and proceeds to normalize the X register. Block 46 is executed next and the X register is written into the Y register. If the Number Oriented Processor was not in the number entry mode in decision block 42 the program proceeds directly to the same point which leads to decision block 54. Decision block 54 checks to see if I5 equals 1. If I5 equals 1 the program goes directly to K4 in FIG. 12 which will be discussed in more detail later. If I5 is not equal to 1, decision block 58 checks to see if I4-I1 equals 15. If this condition is true, the program goes to block 60 which goes to execution of the MCLR instruction (MASTER CLEAR) which clears all internal registers and memory. If the condition is not true, decision block 62 checks I4-I1 for equality to 14. If this condition is true the contents of the X register are exchanged with the contents of the T register in block 66 and the program goes to ENDFUN in block 68 which indicates the completion of the present function and is actually equivalent to a reentry of the program at block 28 in FIG. 2A. If bits I4-I1 are not equal to 14, block 64 is executed which directs the program to K3A (FIG. 11) which will be discussed later.

Figure 3:
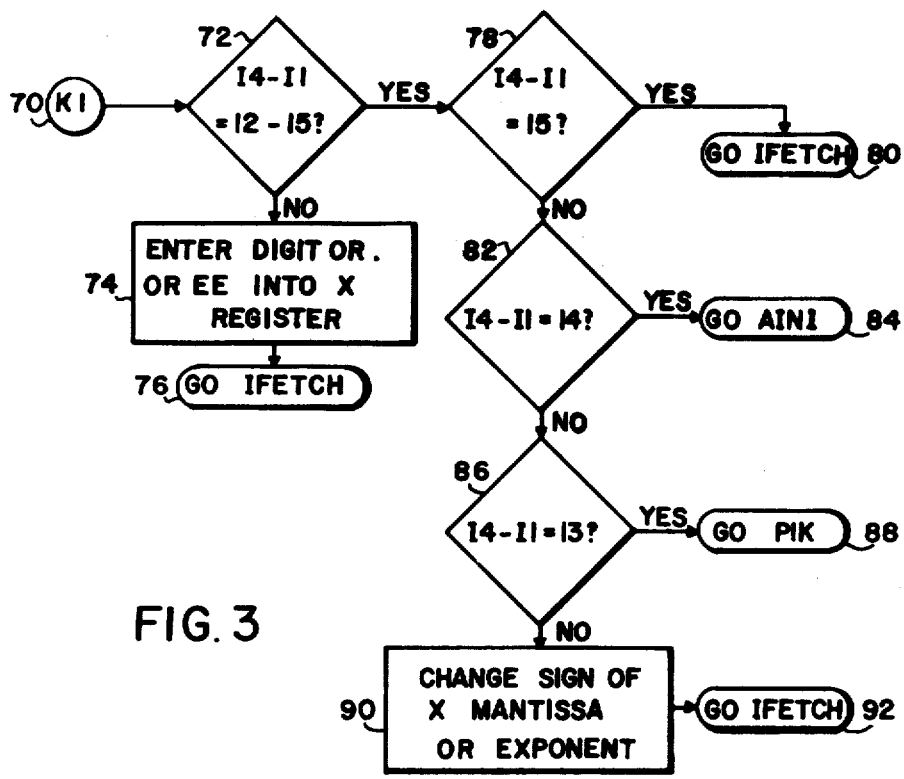
Figure 4A:
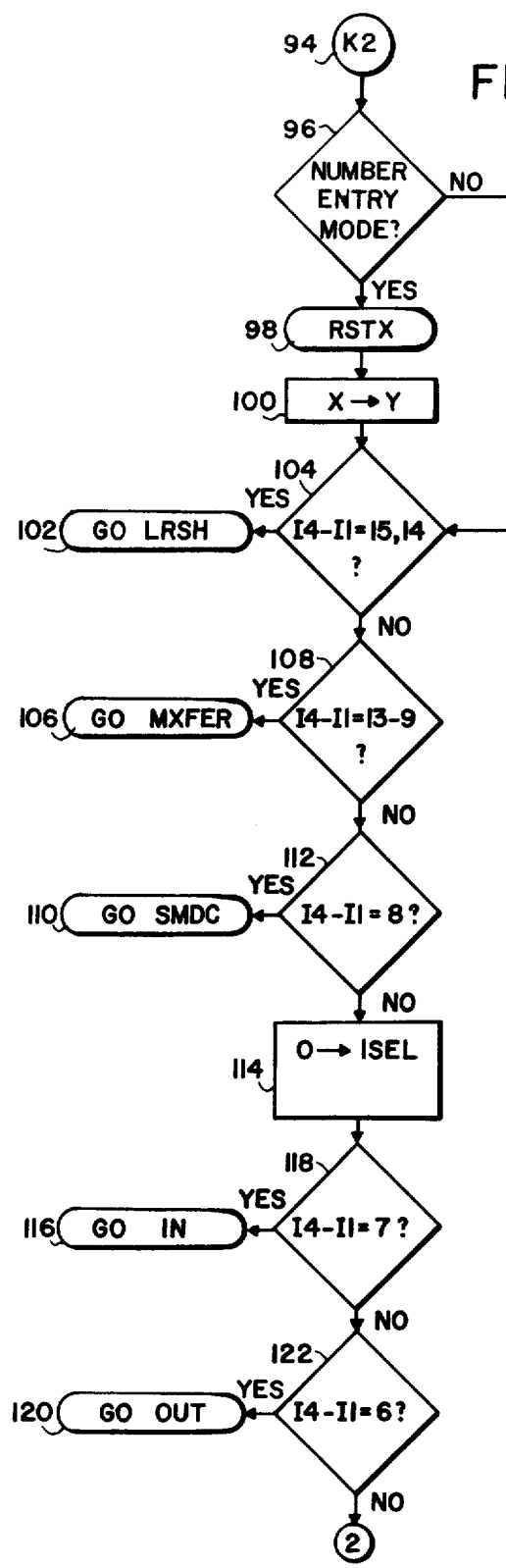

Referring to FIG. 3, the program entry point K1 is shown at 70 into the decision block 72 which checks I4-I1 for equality to 12, 13, 14 or 15. If the value of these bits is not equal to any number 12-15 the program enters the digit entry routine in block 74. At this point the program will enter a numeric digit 0-9 as a mantissa digit, a decimal point or an exponent into the X register.

Figure 13:
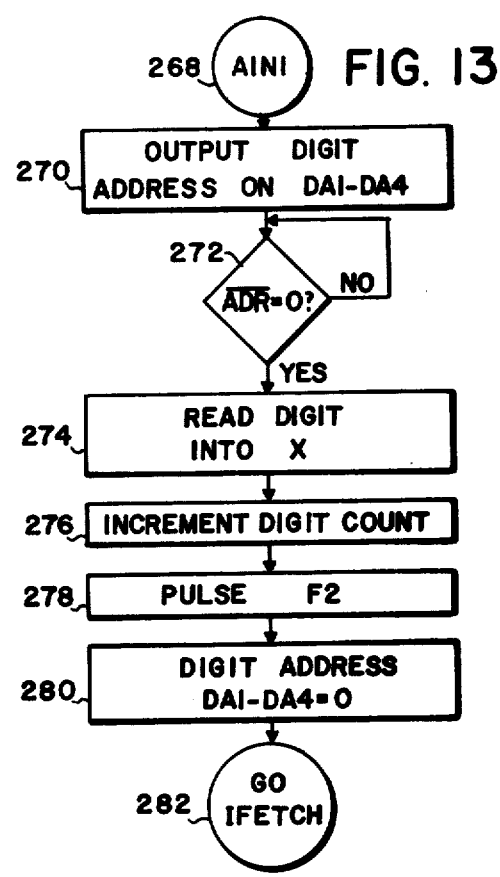

After the completion of block 74, block 76 sends the program to IFETCH in FIG. 2A which is the instruction reading routine for a new instruction. If in decision block 72, I4-I1 equal some number 12 through 15, decision block 78 checks for equality to 15. If this condition is true, the HALT instruction is executed by sending the program directly back to IFETCH in block 80. If the condition is not true, decision block 82 checks for equality to 14. If this is true the AIN instruction is executed by sending the program to AINI in block 84, (FIG. 13). If I4-I1 are not equal to 14, decision block 86 checks for equality to 13. If this is true the program goes to PIK through block 88 and executes the PI instruction. This results in loading the value 3.1415927 into the X register. If the value of I4-I1 is not equal to 13 at this point in the program the CS instruction is executed in block 90. This changes the sign of the X mantissa or the exponent of the X register from its present value to the opposite value. After the execution of block 90, block 92 sets the program back to IFETCH.

Referring to FIG. 4A, the program entry point K2 is shown at 94. Decision block 96 checks to see if the program is presently in the number entry mode. If it is not, the program skips directly to decision block 104. If the number entry mode is presently active, block 98 normalizes the X register. In block 100 the normalized value in the X register is set into the Y register. Decision block 104 then checks instruction bits I4-I1 for equality to 14 or 15. If this condition is true the program goes to LRSH (FIG. 14) via block 102. This path indicates either the LSH or RSH shift instruction is to be executed which will be discussed in more detail in the discussion for FIG. 14.

If I4-I1 are not equal to 14 or 15, decision block 108 checks for equality to any number from 9-13. If this is true the program goes to MXFER via block 106. This indicates that the MS, MR, XEM, IBNZ or DBNZ instruction is to be executed. This path will be discussed in more detail later in the discussion of FIG. 15. If I4-I1 is not equal to 9-13, they are next checked for equality to 8 in decision block 112. If this condition is true, block 110 sends the program to execution of the SMDC instruction which sets the desired mantissa digit count. This path will be more completely explained later in the discussion of FIG. 15. If I4-I1 are not equal to 8, block 114 sets zero to the ISEL output (see FIG. 1A), indicating the combination instruction/data lines are presently in the data mode. Decision block 118 next checks I4-I1 for equality to 7. If this condition is true the program goes to execution of the IN instruction via block 116. This path will be more completely explained later in the discussion of FIG. 17. If I4-I1 are not equal to 7, decision block 122 checks for equality to 6. If this condition is true the program goes to execution of the OUT instruction 120. This path will be more completely explained later in the discussion of FIG. 18A. If I4-I1 is not equal to 6 the program proceeds to entry point 2 on FIG. 4B. Referring to FIG. 4B, the decision block 124 checks I4 to I1 for equality to 3. If this condition is true to program proceeds to TXLT1 via block 126, for execution of the TXF function. This path will be more completely explained later in the discussion of FIG. 9. If I4-I1 is not equal to 3, decision block 128 checks for equality to 2. If this condition is true, the program goes to TXLT0 via block 130 for execution of the TXLT0 instruction. This path will be more completely explained later in the discussion of FIG. 8. If I4-I1 is not equal to 2, decision block 132 checks for equality to 1.

If this condition is true the program goes to TX=0 via block 134 for execution of the TX=0 instruction. This path will be more completely explained later in the discussion of FIG. 7. If I4-I1 is not equal to 1 at this point, decision block 136 checks the JC (jump control) input for a logic 1. If this is true, the program goes to the BRANCH subroutine via block 138. The BRANCH subroutine will be more fully explained in the discussion of FIG. 5. If JC is not equal to 1, the RDY line is pulsed once in block 140 and the program goes to ENDF via block 142. This path ends the present function and is equivalent to a program entry at block 30 on FIG. 2A.

Figure 5:
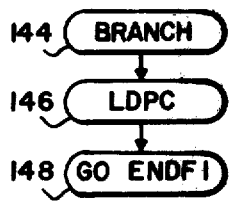
Figure 6:
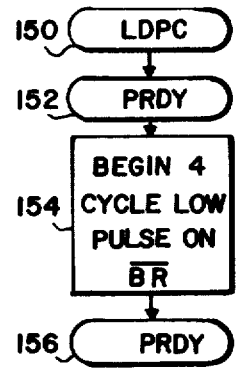

Referring to FIG. 5 the BRANCH subroutine enters at block 144. Block 146 executes the LDPC subroutine which loads the program counter with the proper information. This subroutine is shown in FIG. 6. Block 150 shows LDPC which is the actual loading of the program counter. In block 152 the output RDY line is pulsed low. In block 154 a 4 microinstruction cycle low pulse is output on the $\overline{BR}$ line (see FIG. 1A). In block 156 the RDY line is again pulsed low and the subroutine returns to block 148 in FIG. 5 where it proceeds to ENDF1. This is the end of the function and is equivalent to an entry into the program at block 30 in FIG. 2A.

Figure 7:
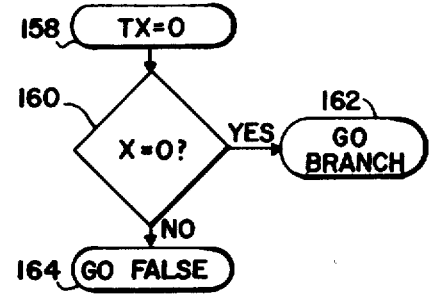
Figure 8:
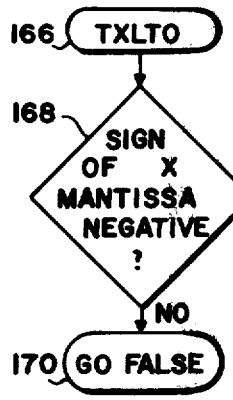

Referring to FIG. 7, the TX=0 instruction is detailed. The entry point is at block 158. Decision block 160 then checks the X register for equality to zero. If this is true, the program is directed to the BRANCH subroutine via block 162. The BRANCH subroutine has been previously described. If the X register is not equal to zero, block 164 directs the program to the false subroutine which merely skips the next word in the MACRO instruction program. This word would be the BRANCH address for the instruction if the true conditions were met. Referring to FIG. 8, the TXLT0 instruction is detailed. The entry point is at block 166. Decision block 168 checks the sign of the X mantissa for a negative value. If this is true to program is directed to the BRANCH subroutine via block 172 and the next instruction is taken as the BRANCH address. If the sign of the X mantissa is not negative, the program is directed to the FALSE subroutine via block 170 and the next MACRO instruction (address) is skipped.

Figure 9:
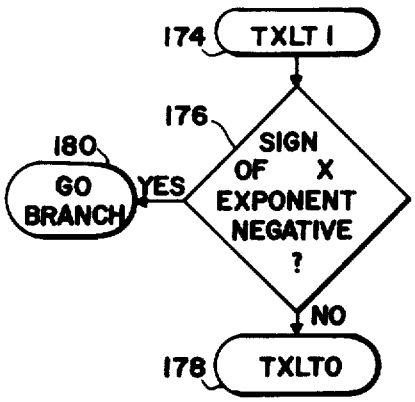

FIG. 9 details the operation of the TXF instruction. The entry point for this subroutine is TXLT1 in block 174. Decision block 176 checks the sign of the X exponent for a negative value. If the X exponent is negative, the program goes to the BRANCH subroutine via block 180. If the value is not negative, the program is directed to the TXLT0 entry point via block 178 which has previously been described in FIG. 8.

Figure 10:
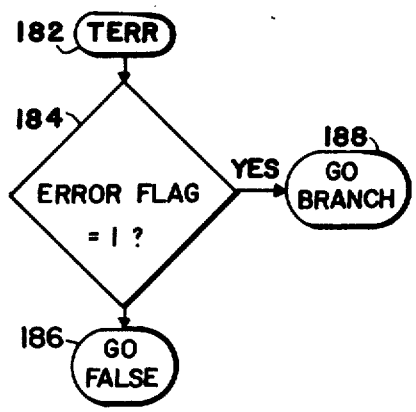

Referring to FIG. 10 the test ERROR flag subroutine is detailed. The entry point is TERR in block 182. Decision block 184 tests the ERROR flag for a logic 1. If the ERROR flag is a logic 1 the program goes to the BRANCH subroutine via block 188 and branches to the address specified in the next MACRO instruction. If the ERROR flag is not equal to 1, the program goes to the FALSE subroutine and skips the next MACRO instruction.

Figure 11:
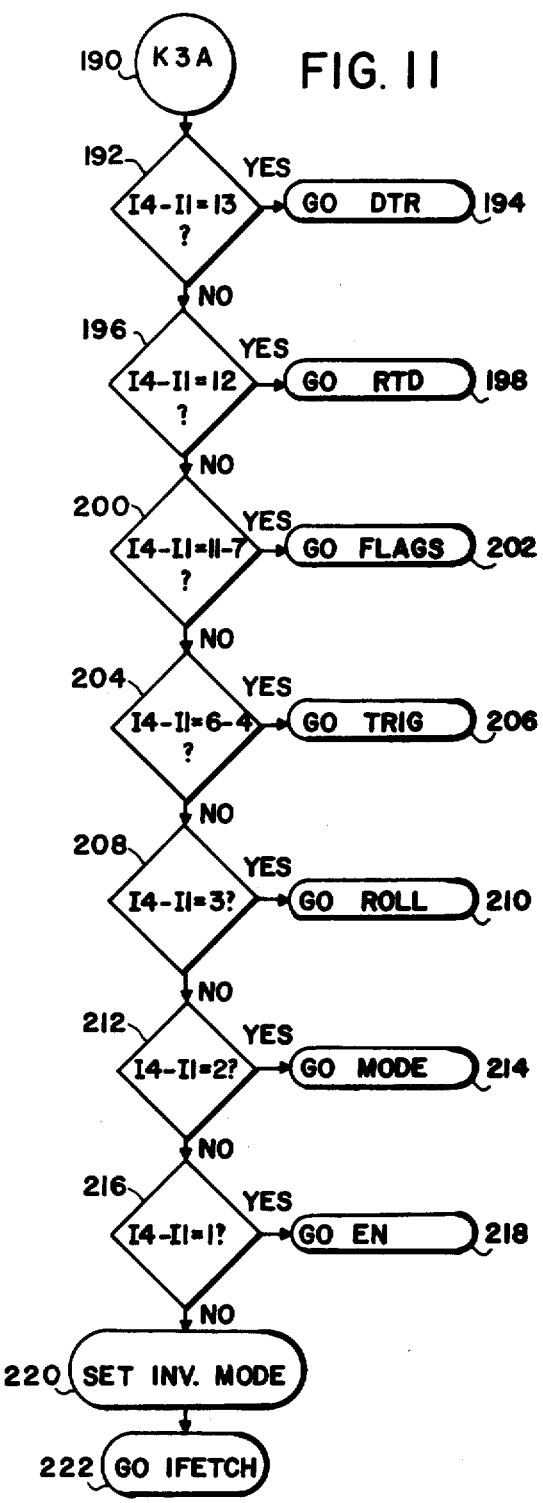

Referring to FIG. 11, the entry point K3A (block 190) is detailed. Decision block 192 checks bits I4-I1 for equality to 13. If this condition is true the program goes directly to the execution of the DTR instruction via block 194. This instruction converts a value in degrees in the X register to an equivalent value in radians. If I4-I1 is not equal to 13, decision block 196 checks for equality to 12. If this condition is true the program goes to execution of the RTD instruction via block 198. This instruction is the complement of DTR and converts radians to degrees in the X register. If I4-I1 are not equal to 12, decision block 200 checks for equality to any number from 7-11. If this condition is true, the program goes to FLAGS via block 202. This indicates that the instruction ECLR, PF1, PF2, SF1 or SF2 will be executed. The details of this path will be more completely explained in the discussion of FIG. 19A. If I4-I1 are not equal to 11-7, decision block 204 checks for equality to numbers from 4-6. If this condition is true the program goes to the TRIG routines via block 206. This indicates that a SIN, SIN$^{-1}$ COS, COS$^{-1}$, TAN or TAN$^{-1}$ function is to be performed. If the value of I4-I1 is not equal to 4-6, decision block 208 checks for equality to 3. If this condition is true, the program goes to the ROLL subroutine via block 210. This subroutine will be more completely explained in the discussion of FIG. 20.

If I4-I1 is not equal to 3, decision block 212 checks for equality to 2. If this condition is true, the program goes to the MODE subroutine via block 214 to execute the TOGM instruction. This subroutine will be more completely explained in the discussion of FIG. 21. If I4-I1 is not equal to 2, decision block 216 checks I4-I1 for equality to 1. If this condition is true, the program goes to the EN subroutine via block 218. This subroutine will be more completely explained in the discussion for FIG. 22.

If I4-I1 is not equal to 1 at this point, the program sets the inverse mode in block 220 indicating that an inverse function is to be executed. Block 222 then sends the program to IFETCH for a new instruction.

Figure 12:
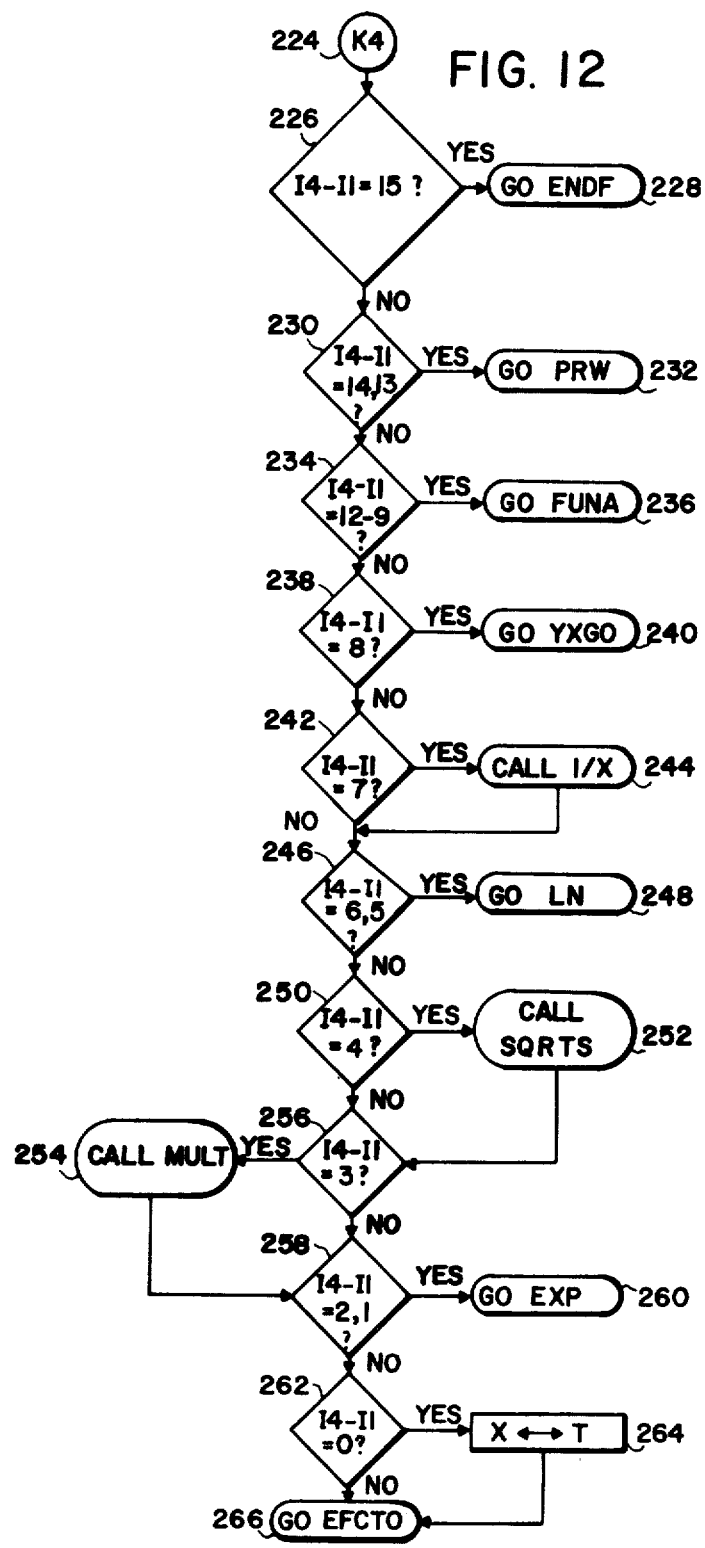

Referring to FIG. 12, the program entry point K4 is shown in block 224. Decision block 226 checks I4-I1 for equality to 15. If this condition is true the program goes to ENDF via block 228 thus executing the NOP (NO OPERATION) instruction. If I4-I1 is not equal to 15, decision block 230 checks for equality to 14 or 13. If this condition is true the program goes to PRW via block 232. This indicates the PRW1 or PRW2 instruction is to be executed. This function will be more completely described in the discussion of FIG. 23.

If I4-I1 is not equal to 14 or 13, decision block 234 checks for equality to any number 9-12. If this condition is true the program goes to FUNA via block 236 for the execution of an arithmetic function. This function may be either plus, minus, times or divide, depending solely on the actual value of instruction lines 1-4. If I4 to I1 is not equal to 9-12, decision block 238 checks for equality to 8. If this condition is true, the program goes to YXGO via block 240 for execution of the YX instruction. If I4-I1 is not equal to 8, decision block 242 checks for equality to 7. If this condition is true the 1/X instruction is executed in block 244 and the program is returned to the same flow. If I4-I1 is not equal to 7, the program proceeds directly to decision block 246 which checks for equality to 6 or 5. If this condition is true, the program goes to LN via block 248 which executes the natural logarithm (LN) or the base 10 logarithm (LOG) instruction. If I4-I1 is not equal to 6 or 5, the decision block 250 checks for equality to 4. If this condition is true the program calls the SQRTS subroutine in block 252. This executes the SQRT instruction taking the square root of the number in the X register. Program flow continues into decision block 246 after execution of the square root function or if I4-I1 is not equal to 4.

Decision block 256 checks I4-I1 for equality to 3. If this is true the program calls MULT in block 254 and executes the SQ instruction which squares the number in the X register.

The program next proceeds into decision block 258 from the MULT instruction or if I4-I1 is not equal to 3. Decision block 258 checks I4-I1 for equality to 2 or 1. If this condition is true the program goes to the EXP subroutine via block 260. This indicates that the EX or 10X instruction will be executed. If I4-I1 is not equal to 2 or 1, decision block 262 checks for equality to 0. If this is true, the X register is exchanged with the T register thus executing the XEY instruction. Note that the user available Y register is the presently referred to T register in internal notation. The program then proceeds to block 266 after completion of the register exchange or if I4-I1 is not equal to 1 the program goes to EFCTO which will be more completely described in FIG. 26.

Referring to FIG. 13, the entry point AINI in block 268 is the start of execution of the AIN instruction. In block 270, the digest address is output on lines DA1--DA4 (see FIG. 1B). Decision block 272 checks the $\overline{ADR}$ (see FIG. 1A) line for equality to zero. If this line is not equal to zero the program loops at this point until the line becomes zero, the proceeds to block 274. At this point a digit is read into the X register. In block 276 the digit count is incremented and in block 278, line F2 is pulsed low (see FIG. 1B). In block 280 the digit address DA1-DA4 is set equal to zero. The digit count is maintained in a register digit. In block 282 the program is directed back to IFETCH for the next instruction.

Figure 14:
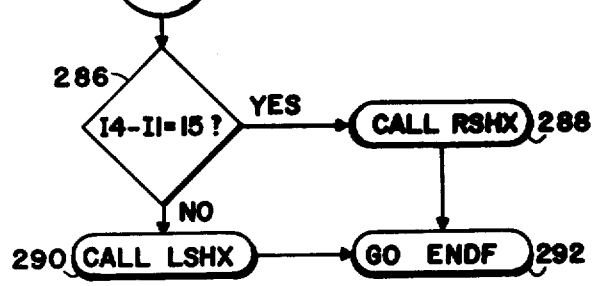

Referring to FIG. 14, the entry point LRSH is shown in block 284. This subroutine implements the right shift or left shift (RSH or LSH) instruction. Decision block 286 checks I4-I1 for equality to 15. If this condition is true, block 288 calls subroutine RSH thus implementing the RSH (right shift) instruction. The program then goes to ENDF via block 292 as the end of the function. If I4-I1 is not equal to 15, block 290 calls LSHX executing the LSH (left shift) instruction, then proceeds to block 292 and the ENDF end of function.

Figure 15:
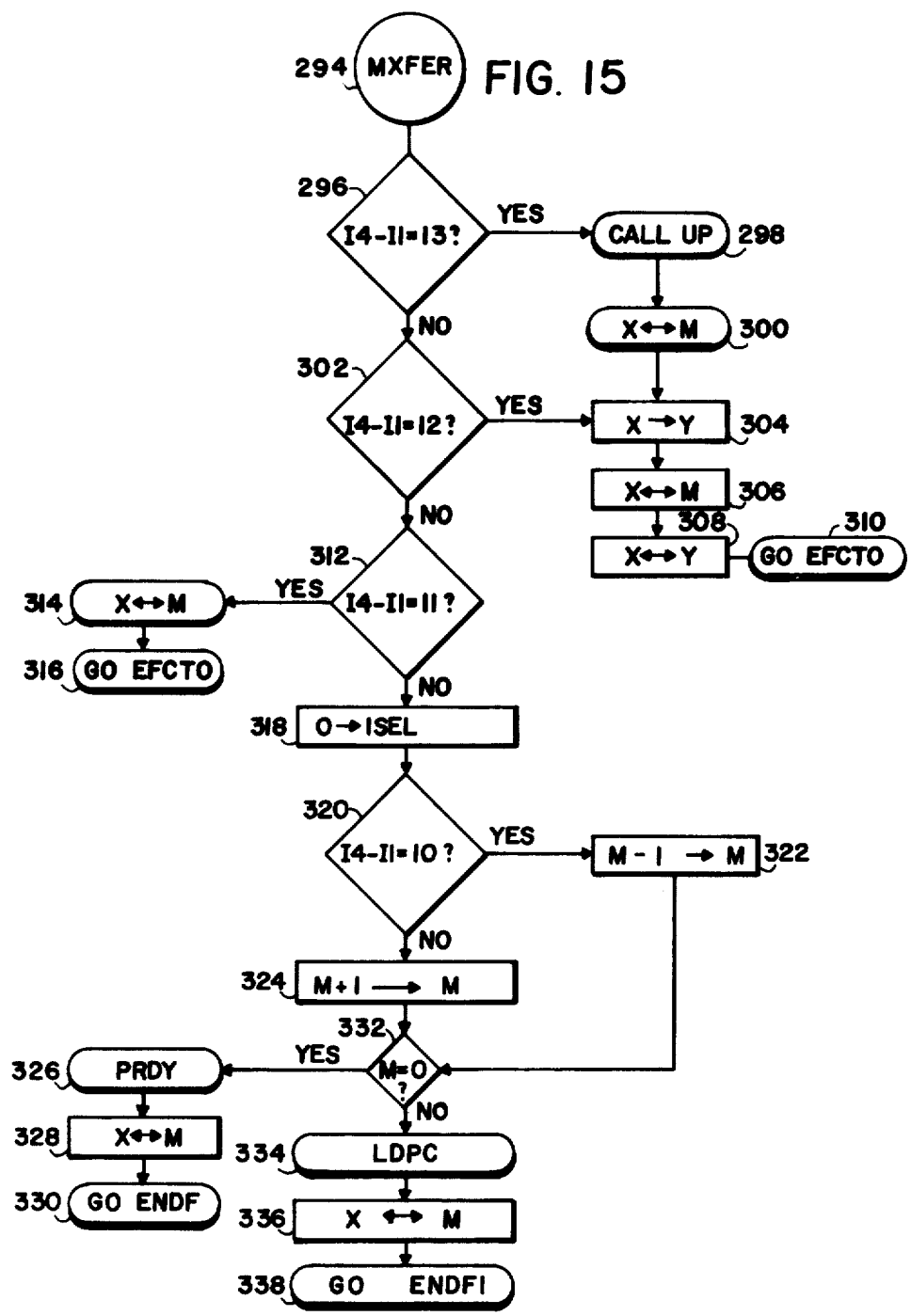

Referring to FIG. 15, the MXFER entry point is shown in block 294. This section of the program will execute the MR, MS, XEM, IBNZ or DBNZ instruction depending on the actual value of I4-I1. Decision block 296 checks I4-I1 for equality to 13. If this condition is true, the program calls the UP subroutine in block 298 in preparation for executing the MR instruction. This moves internal registers X to Y, Y to Z and Z to T as shown in FIG. 27. In block 300 the contents of the X register are exchanged with the contents of the M register. Since the value of the M register should remain unchanged when the MR instruction is executed the program must proceed through blocks 304, 306, and 310, after the execution of block 300. In block 304 the contents of the X register are written into the Y register since the present contents of the X register is the previous contents of the M register at this point both the X and Y registers contain the previous contents of M while the M register contains the previous contents of X. In block 306, the contents of the X register are again exchanged with the contents of M, placing the previous contents of the M register back into the M register and the original contents of A back into the A register. In block 308 the contents of X are then exchanged with the contents of Y resulting in the original contents of X being written into the Y register and the original contents of the M register being written into the X register, which was the original intent of the MR instruction. At this point the original contents of the memory register is also resident in the M register. Block 310 completes the function by directing the program to the EFCTO subroutine which rounds X to 8 digits as will be discussed later in reference to FIG. 26. If the value of I4-I1 is not equal to 13, decision block 302 checks for equality to 12. If this condition is true, the MS instruction is to be executed. In block 304 the contents of the X register are written into the Y register. In block 306 the contents of the X register are then exchanged with the M register, then in block 308 the contents of the X and Y registers are again exchanged. The result of this is to write the information in the X register into the memory register while retaining that same information in the X register. The program is again directed to subroutine EFCTO at block 310 for rounding. If I4-I1 is not equal to 12, decision block 312 checks for equality to 11. If this condition is true, the XEM instruction is executed. In block 314 the contents of the M register and in block 316 the program is directed to EFCT0 subroutine for rounding. If I4-I1 is not equal to 11 a zero is written to the ISEL line in block 318 indicating the combination instruction and data lines are set into the data mode. Decision block 320 checks I4-I1 for equality to 10. If this condition is true the DBNZ instruction is to be executed. In block 322 the contents of the memory register is replaced by the same contents decremented by 1. The program then proceeds to decision block 332 where the contents of the memory register is checked for equality to zero. If I4-I1 is not equal to 10, th IBNZ (increment and BRANCH if not zero) instruction is to be executed. In block 324 the contents of the memory register is replaced with the contents of the memory register incremented by 1. The program then proceeds to decision block 332 where the contents of the memory register is checked for equality to zero. The remainder of FIG. 15 is the skip or no-skip portion of the IBNZ and DBNZ instructions. If the memory register was not equal to zero the program counter is loaded to the skip address in block 334. Block 336 shows the contents of the X register being exchanged with the contents of the M register. This is necessary since the actual program implementation in block 322 and 324 exchange the contents of the M register with the contents of the X register then increment or decrement as required in the IBNZ or DBNZ instruction. Block 322 actually checks the X register for zero to determine if the next instruction should be skipped or not. Thus the resulting incremented or decremented contents of the X register must be replaced in the M register and the original contents of the X register replaced from the M register. This is done in block 336 for the case when the skip is to be executed (because the contents of the M register was decremented or incremented to zero). Block 338 directs the program back to ENDF1 for completion of the function. If the M register was equal to zero in decision block 332, the RDY line is pulsed low in block 336 and the X register is exchanged with the M register in block 328 (for the reasons previously described) and the program is directed to the ENDF completion of function routine in block 330.

Figure 16:
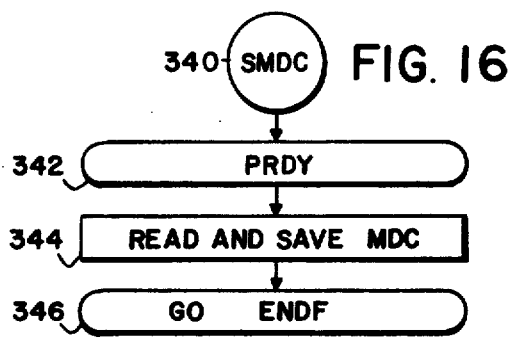

Referring to FIG. 16, the SMDC entry point is shown in block 340. This section executes the SMDC (set mantissa digit count) instruction. In block 342, the RDY line is pulsed low. In block 344 the mantissa digit count is read (from D1-D4, see FIG. 1A) and saved in a holding register. Block 346 completes the function with a GO to ENDF completion of function subroutine.

Figure 17:
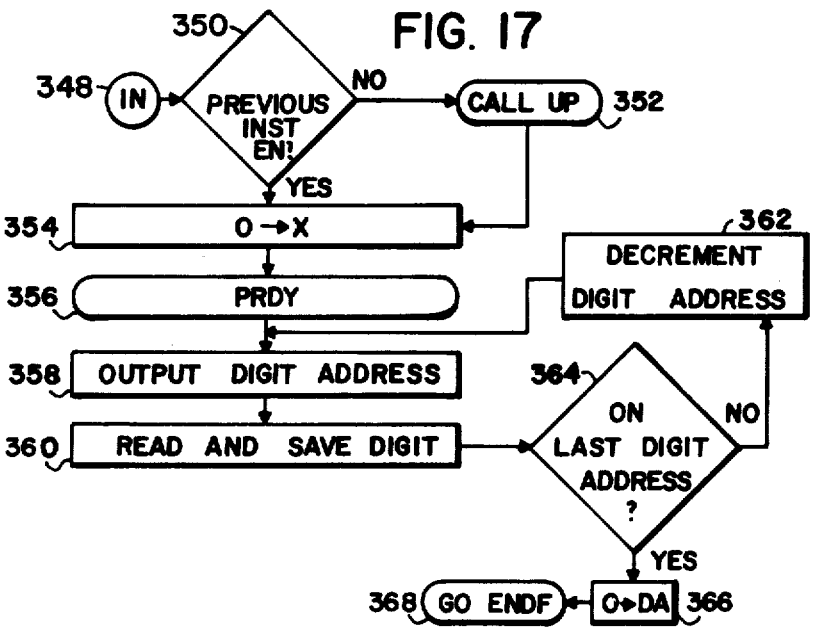

Referring to FIG. 17 block 348 is the entry point IN for the IN instruction. Decision block 350 checks to see if the previous instruction executed was a EN (ENTER) instruction. If this condition is not true the program calls the UP subroutine in block 352 to push the internal register stack as shown in FIG. 27. In block 354 the X register is set to zero. The RDY line is pulsed in block 356 then the digit address is output on the DA1 to DA4 lines in block 358. The digit DATA is read from the D1-D4 inputs and saved in the X register in block 360. Decision block 364 checks to see if the last digit address has been reached and if not the digit address is decremented in block 362 and the next digit address is output (on DA1-DA4, see FIG. 1B) and the next digit read in blocks 358 and 360. When the last digit address is detected in decision block 364, a zero is written into the DA output lines in block 366. The program then proceeds to the ENDF function in block 368.

Figure 18A:
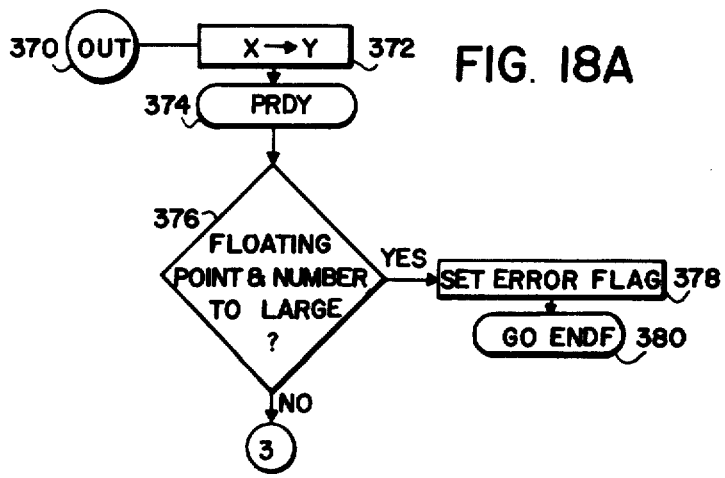
Figure 18B:
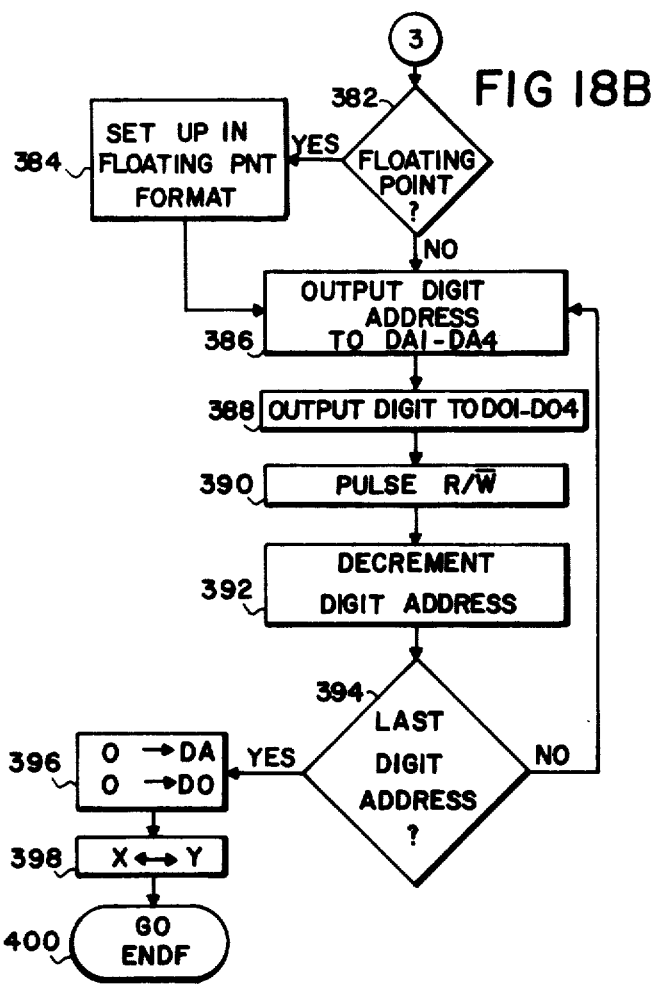

Referring to FIG. 18A, the entry point at 370 for the OUT instruction is shown. In block 372, the X register is written into the Y register. The RDY line is pulsed low in block 374 and the decision block 376 checks to see if the program is in the floating point mode and if the present number is too large. If the result of this test is true, the ERROR flag is set in block 378 and the program goes to the ENDF end of function routine. If the number is not too large in the floating point mode or if the program is in scientific mode, the program goes to entry point 3 in FIG. 18B. Decision block 382 then checks to see if the program is in fact in the floating point mode. If the program is presently operating in the floating point mode block 384 sets up the data in the floating point format in block 384 and returns to block 386. If the program is not presently in the floating point mode it proceeds directly to block 386. At this point the digit address is output on lines DA1-DA4 (see FIG. 1B). In block 388 the value of the digit is output to lines DO1-DO4 (see FIG. 1B). In block 390 the R/$\overline{W}$ line is pulsed low and in block 392 the digit address is decremented to point to the next digit to be output. Decision block 394 checks to see if this is the last digit address and data. If this is the last digit address, a zero is set into the DA (address) lines and into the DO (data) lines, in block 396. Block 398 exchanges the X and Y registers then block 400 directs the program to ENDF end of function routine.

Figure 19A:
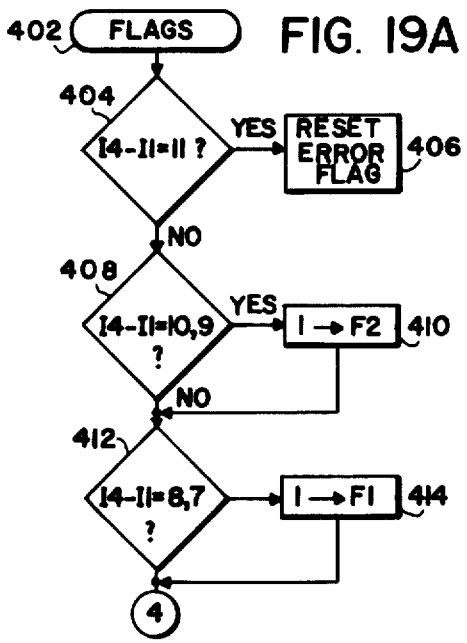
Figure 19B:
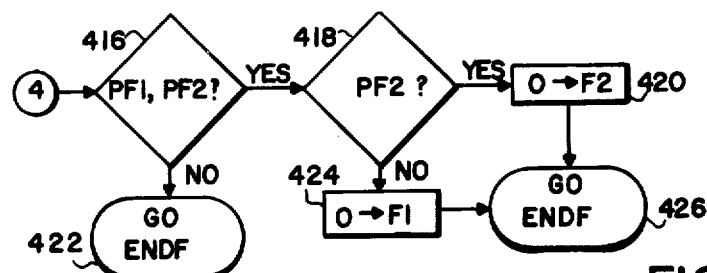

Referring to FIG. 19A the FLAGS routine is entered at block 402. Decision block 404 checks instruction lines I4-I1 for equality to 11. If this condition is true, the ERROR flag is reset in block 406 to perform the ECLR instruction. If this condition is not true, decision block 408 checks I4-I1 for equality to 10 or 9. If this condition is true, a 1 is output on the F2 line (see FIG. 1B) implementing the SF2 or PF2 instruction. If the condition is not true, decision block 412 checks I4-I1 for equality to 8 or 7. If this condition is true, a 1 is set into the F1 output in block 414 implementing the SF1 or PF1 instruction. If the condition is not true the program is directed to entry point 4 on FIG. 19B. Decision block 416 checks to determine if a PF1 or PF2 instruction is desired. If the result of this test is not true the instruction to be executed is SF1 or SF2 and the program goes directly to ENDF (end of function) via block 422. If a PF1 or PF2 instruction is required, the program checks to see if a PF2 instruction is desired in decision block 418. If the result of this test is true, a zero is written into the F2 output in block 420 and the PF2 instruction is executed. The program then goes to the ENDF subroutine for end of function via block 426. If the result of the decision block 418 test is not true, the program is directed to block 424 and a zero is written to the F1 output (see FIG. 1B) executing the PF1 instruction. The program is then directed to ENDF end of function routine via block 426.

Figure 20:
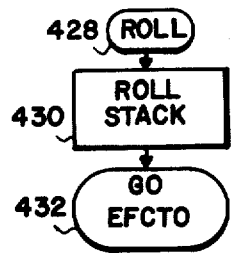

Referring to FIG. 20, the ROLL instruction entry point is shown at block 428. In 430 the stack is rolled by moving the user registers X to T, T to Z, Z to Y and Y to X. In block 432 the program is directed to EFCTO for rounding.

Figure 21:
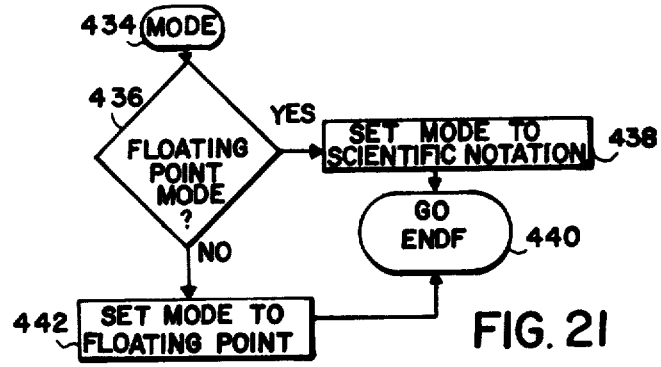

FIG. 21 shows the entry point MODE in block 434 for execution of the TOGM instruction. Decision block 436 checks to see if the program is presently operating in the floating point mode. If the answer is yes the program is set into the scientific mode in block 438 then goes to the ENDF end of function routine via block 440. If the program is not presently operating in a floating point mode in decision block 436, the program goes to block 442 an sets the program into the floating point mode, then goes to block 440 ENDF for the end of function routine.

Figure 22:
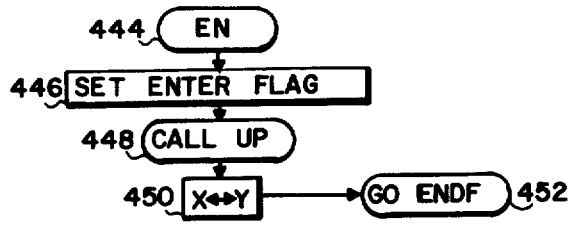

Referring to FIG. 22, the entry point for the EN instruction is shown in block 444. Block 446 sets the enter flag and block 448 calls the UP subroutine which pushes the internal stack (see FIG. 27). Block 450 exchanges the X and Y registers, then sends the program to ENDF end of function routine via block 452.

Figure 23:
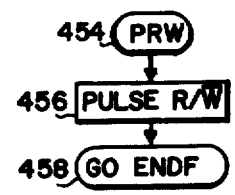

Referring to FIG. 23 the entry point PRW for the execution of the PRW1 and PRW2 instructions is shown in block 454. In block 456 the R/W line is pulsed low. Block 458 sends the program back to the end of function routine ENDF.

Figure 24A:
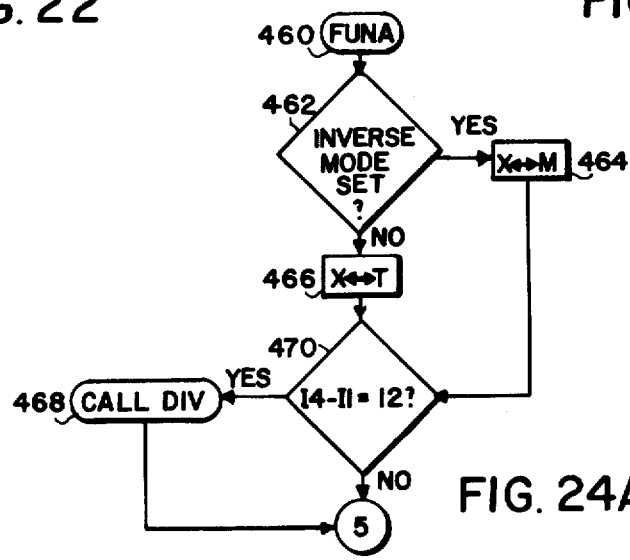
Figure 24B:
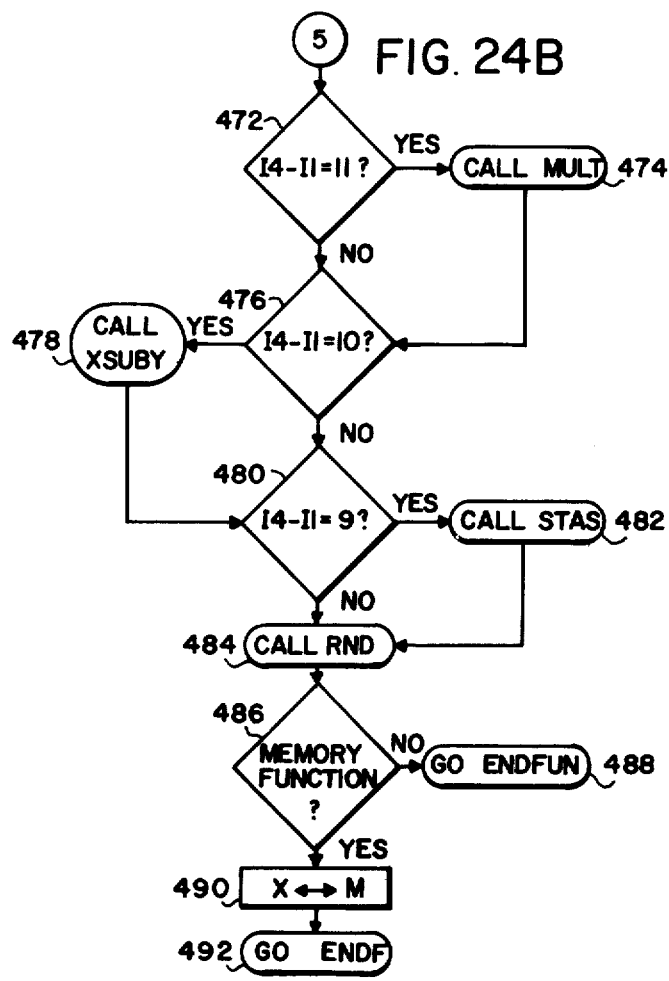

FIG. 24A shows the entry point FUNA in block 460 for the arithmetic function instructions. The instructions decoded and executed in this block are + −, × and /. Decision block 462 first checks to see if the inverse mode has been set. If the result of this test is true, the contents of the X register are exchanged with the contents of the M register in block 464. The program then proceeds directly to decision block 470. If the inverse mode has not been set, the contents of the X register is exchanged with the contents of the T register in block 466, and the program then proceeds to decision block 470. In decision block 470 instruction lines I4–I1 are checked for equality to 12. If the result of this test is true, the / (divide) instruction is executed by calling the DIV subroutine in block 468. The program then proceeds to entry point 5 in FIG. 24B. Decision block 472 checks I4 to I1 for equality to 11. If the result of this test is true, the program calls the X (multiply) routine in block 474 which executes the times instruction multiplying user register Y by user register X. After completion of the multiply function, the program proceeds to decision block 476. If I4–I1 was not equal to 11 the program proceeds directly to decision block 476 which checks I4–I1 for equality to 10. If the result of this test is true the program calls XSUBY subroutine in block 478 thus implementing the—or subtract subroutine. The purpose of this subroutine is to change the sign of the operand in the subtract operation in preparation for the performance of an addition subroutine. The net result is to perform a subtract operation. The program then proceeds to decision block 480 which checks I4–I1 for equality to 9. If I4–I1 were not equal to 10 in block 476 the sign of the operand would not be changed and the program would proceed directly to decision block 480. If the result of the test in decision block 480 is true, the program calls the subroutine STAS in block 482 which starts the execution of the addition or subtraction instruction. If a subtraction instruction is to be performed, the sign of the operand has been changed in block 478 so an addition operation is always performed at this point. The program proceeds from block 482 to block 484 and calls the RND or rounding subroutine. This rounds the resultant number to the proper number of digits. If the result of the test in block 480 was not true, the program proceeds directly to block 484 and is rounded. Decision block 486 checks to see if a memory function is presently being executed. If the result of this test is negative, the program goes directly to the ENDFUN subroutine in block 488 which ends the function. If the result of the test is true, the program goes to block 490 where the contents of the X register are exchanged with the contents of the M register. In block 492 the program is then directed to the ENDF end of function subroutine.

Figure 25:
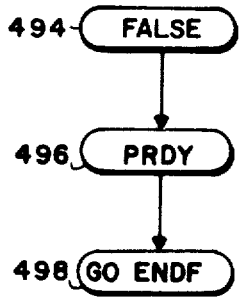

Referring to FIG. 25, the entry point to the FALSE routine is block 494. The RDY output (see FIG. 1B) is pulsed low in block 496. The program then goes to the ENDF end of function routine in block 498.

Figure 26:
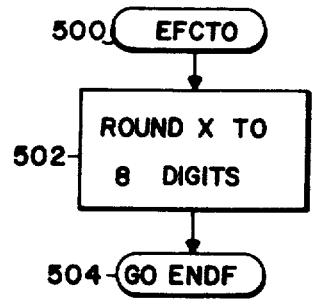
Figure 27:
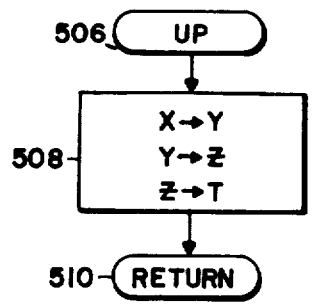

Referring to FIG. 26, the rounding subroutine is shown with entry point EFCTO in block 500. In block 502, the value in X register is rounded to 8 digits. Block 504 directs the program to the ENDF end of function routine.

Referring to FIG. 27, the UP subroutine is shown with entry point in block 506. In block 508, the internal register stack (not the same as the user available stack) is pushed down. The contents of registers are moved X to Y, Y to Z, and Z to T. The subroutine returns to the next operation after the one from which it was called in block 510.

APPENDIX I

Instruction Description Table (* Indicates 2-word instruction)

| CLASS | SUBCLASS | MNEMONIC* | OCTAL OP CODE | FULL NAME | DESCRIPTION |
|---|---|---|---|---|---|
| Digit | | 0 | 00 | 0 | Mantissa or exponent digits. On first digit (d) |
| Entry | | 1 | 01 | 1 | the following occurs: Z → T |
| | | 2 | 02 | 2 | Y → Z |
| | | 3 | 03 | 3 | X → Y |
| | | 4 | 04 | 4 | d → X |
| | | 5 | 05 | 5 | See description of number entry on page 11 |
| | | 6 | 06 | 6 | |
| | | 7 | 07 | 7 | |
| | | 8 | 10 | 8 | |
| | | 9 | 11 | 9 | |
| | | DP | 12 | Decimal Point | Digits that follow will be mantissa fracton. |
| | | EE | 13 | Enter Exponent | Digits that follow will be exponent. |
| | | CS | 14 | Change Sign | Change sign of exponent or mantissa. |

APPENDIX I-continued

Instruction Description Table (* Indicates 2-word instruction)

| CLASS | SUBCLASS | MNEMONIC* | OCTAL OP CODE | FULL NAME | DESCRIPTION |
|---|---|---|---|---|---|
| | | | | | $X_m$ = X mantissa |
| | | | | | $X_e$ = X exponent |
| | | | | | CS causes $-X_m \to X_m$ or $-X_e \to X_e$ depending on whether or not an EE instruction was executed after last number entry iniation. |
| | | PI | 15 | Constant $\pi$ | $3.1415927 \to X$, stack not pushed. |
| | | EN | 41 | Enter | Terminates digit entry and pushes the stack. The argument entered will be in X and Y. |
| | | | | | $Z \to T$ |
| | | | | | $Y \to Z$ |
| | | | | | $X \to Y$ |
| | | NOP | 77 | No Operation | Do nothing instruction that will terminate digit entry. |
| | | HALT | 17 | Halt | External hardware detects HALT op code and generates HOLD = 1. Processor waits for HOLD = 0 before continuing. HALT acts as a NOP and may be inserted between digit entry instructions since it does not terminate digit entry. |
| Move | | ROLL | 43 | Roll | Roll Stack. |
| | | | | | X |
| | | | | | T    Y |
| | | | | | Z |
| | | POP | 56 | Pop | Pop Stack. |
| | | | | | $Y \to X$ |
| | | | | | $Z \to Y$ |
| | | | | | $T \to Z$ |
| | | | | | $O \to T$ |
| | | XEY | 60 | X exchange Y | Exchange X and Y. |
| | | | | | $X \longleftrightarrow Y$ |
| | | XEM | 33 | X exchange M | Exchange X with memory. |
| | | | | | $X \longleftrightarrow M$ |
| | | MS | 34 | Memory Store | Store X in Memory. |
| | | | | | $X \to M$ |
| | | MR | 35 | Memory Recall | Recall Memory into X. |
| | | | | | $M \to X$ |
| | | LSH | 36 | Left Shift $X_m$ | X mantissa is left shifted while leaving decimal point in same position. Former most significant digit is saved in link digit. Least significant digit is zero. |
| | | RSH | 37 | Right Shift $X_m$ | X mantissa is right shifted while leaving decimal point in same position. Link digit, which is normally zero except after a left shift, is shifted into the most significant digit. Least significant digit is lost. |
| Math | F (X,Y) | + | 71 | Plus | Add X to Y. $X + Y \to X$. On +, −, ×, / and YX instructions, stack is popped as follows: |
| | | | | | $Z \to Y$ |
| | | | | | $T \to Z$ |
| | | | | | $O \to T$ |
| | | | | | Former X, Y are lost. |
| | | − | 72 | Minus | Subtract X from Y. $Y - X \to X$ |
| | | × | 73 | Times | Multiply X times Y. $Y \times X \to X$ |
| | | / | 74 | Divide | Divide X into Y. $Y \div X \to X$ |
| | | YX | 70 | Y to X | Raise Y to X power. $Y^X \to X$ |
| | F (X,M) | INV +* | 40, 71 | Memory Plus | Add X to memory. $M + X \to M$ |
| | | | | | On INV +, −, × and / instructions, X, Y, Z, and T are unchanged. |
| | | INV −* | 40, 72 | Memory Minus | Subtract X from memory. $M - X \to M$ |
| | | INV ×: | 40, 73 | Memory Times | Multiply X times memory. $M \times X \to M$ |
| | | INV /* | 40, 74 | Memory Divide | Divide X into memory. $M \div X \to M$ |
| | F (X) Math | 1/X | 67 | One Divided by X | $1 \div X \to X$. On all F (X) math instructions Y, Z, T and M are unchanged and previous X is lost. |
| | | SQRT | 64 | Square Root | $\sqrt{X} \to X$ |
| | | SQ | 63 | Square | $X^2 \to X$ |
| | | 10X | 62 | Ten to X | $10^X \to X$ |
| | | EX | 61 | E to X | $e^X \to X$ |
| | | LN | 65 | Natural log of X | $\ln X \to X$ |
| | | LOG | 66 | Base 10 log of X | $\log X \to X$ |
| | F (X) Trig | SIN | 44 | Sine X | $SIN(X) \to X$. On all F(X) trig functions, Y, Z, T, and M are unchanged and the previous X is lost. |
| | | COS | 45 | Cosine X | $COS(X) \to X$ |
| | | TAN | 46 | Tangent X | $TAN(X) \to X$ |
| | | INV SIN* | 40, 44 | Inverse sine X | $SIN^{-1}(X) \to X$ |
| | | INV COS* | 40, 45 | Inverse cosine X | $COS^{-1}(X) \to X$ |

APPENDIX I-continued

Instruction Description Table (* Indicates 2-word instruction)

| CLASS | SUBCLASS | MNEMONIC* | OCTAL OP CODE | FULL NAME | DESCRIPTION |
|---|---|---|---|---|---|
| | | INV TAN* | 40, 46 | Inverse tan X | $TAN^{-1}(X) \rightarrow X$ |
| | | DTR | 55 | Degrees to radians | Convert X from degrees to radians. |
| | | RDT | 54 | Radians to degrees | Convert X from radians to degrees. |
| Clear | | MCLR | 57 | Master Clear | Clear all internal registers and memory; initialize I/O control signals, MDC = 8, MODE = floating point. (see initialization.) |
| | | ECLR | 53 | Error flag clear | $0 \rightarrow$ Error flag |
| Branch | Test | JMP* | 25 | Jump | Unconditional branch to address specified by second instruction word. On all branch instructions, second word contains branch address to be loaded into external PC. |
| | | TJC* | 20 | Test jump condition | Branch to address specified by second instruction word if JC ($I_6$) is true (=1). Otherwise, skip over second word. |
| | | TERR* | 24 | Test error | Branch to address specified by second instruction word if error flag is true (=1). Otherwise, skip over second word. May be used for detecting specific errors as opposed to using the automatic error recovery scheme dealt with in the section on Error Control. |
| | | TX = 0* | 21 | Test X = o | Branch to address specified by second instruction word if X = 0. Otherwise, skip over second word. |
| | | TXF* | 23 | Test $|X| < 1$ | Branch to address specified by second instruction word if $|X| < 1$. Otherwise, skip over second word. (i.e. branch if X is a fraction.) |
| | | TXLT0* | 22 | Test X < 0 | Branch to address specified by second instruction word if X < 0. Otherwise, skip over second word. |
| Branch | Count | IBNZ | 31 | Increment memory and branch if $M \neq 0$ | $M + 1 \rightarrow M$. If M = 0, skip second instruction word. Otherwise, branch to address specified by second instruction word. |
| | | DBNZ | 32 | Decrement memory and branch if $M \neq 0$ | $M - 1 \rightarrow M$. If M = 0, skip second instruction word. Otherwise, branch to address specified by second instruction word. |
| I/O | Multi-digit | IN* | 27 | Multidigit input to X | The processor supplies a 4-bit digit address (DA4-DA1) accompanied by a digit address strobe ($\overline{DAS}$) for each digit to be input. The high order address for the number to be input would typically come from the second instruction word. The digit is input on D4-D1, using ISEL = 0 to select digit data instead of instructions. The number of digits to be input depends on the calculation mode (scientific notation or floating point) and the mantissa digit count (See Data Formats and Instruction Timing). Data to be input is stored in X and the stack is pushed ($X \rightarrow Y \rightarrow Z = T$). At the conclusion of the input, DA4-DA1 = 0. |
| | | OUT* | 26 | Multidigit output from X | Addressing and number of digits is identical to IN instruction. Each time a new digit address is supplied, the processor places the digit to be output on DO4-DO1 and pulses the R/$\overline{W}$ line active low. At the conclusion of output, DO4-DO1 = 0 and DA4-DA1 = 0. |
| I/O | Single-digit | AIN | 16 | Asynchronous Input | A single digit is read into the processor on D4-D1. ISEL = 0 is used by external hardware to select the digit instead of instruction. It will not read the digit until $\overline{ADR}$ = 0 (ISEL = 0 selects $\overline{ADR}$ instead of $I_5$), indicating data valid. F2 is pulsed active low to acknowledge data just read. |
| I/O | Flags | SF1 | 47 | Set Flag 1 | Set F1 high, i.e. F1 = 1. |
| | | PF1 | 50 | Pulse Flag 1 | F1 is pulsed active high. If F1 is already high, this results in it being set low. |
| | | SF2 | 51 | Set Flag 2 | Set F2 high, i.e. F2 = 1. |
| | | PF2 | 52 | Pulse Flag 2 | F2 is pulsed active high. If F2 is already high, this results in it being set low. |
| | | PRW1 | 75 | Pulse R/$\overline{W}$ 1 | Generates R/$\overline{W}$ active low pulse which may be used as a strobe or to clock extra instruction bits into a flip-flop or register. |
| | | PRW2 | 76 | Pulse R/$\overline{W}$ 2 | Identical to PRW1 instruction. Advantage may be taken of the fact that the last 2 bits of the PRW1 op code are 10 and the last 2 bits of the PRW2 op code are 01. Either of these bits can be clocked into a flip-flop using the R/$\overline{W}$ pulse. |
| Mode Control | | TOGM | 42 | Toggle Mode | Change mode from floating point to scientific notation or vice-versa, depending on present mode. The mode affects only the IN and OUT instructions. Internal calculations are always in |

APPENDIX I-continued

Instruction Description Table (* Indicates 2-word instruction)

| CLASS | SUBCLASS | MNEMONIC* | OCTAL OP CODE | FULL NAME | DESCRIPTION |
|---|---|---|---|---|---|
| | | SMDC* | 30 | Set Mantissa Digit Count | 8-digit scientific notation. Mantissa digit count is set to the contents of the second instruction word (= 1 to 8). |
| | | INV | 40 | Inverse Mode | Set inverse mode for trig or memory function instruction that will immediately follow. Inverse mode is for next instruction only. |

What is claimed is:

1. A number processor for providing digit data and digit position and adapted to be coupled to and controlled by a first microprocessor means wherein said first microprocessor means provides MACRO instructions, timing and control information directly to the control logic of said number processor in the form of digital signals to synchronize said number processor with said first microprocessor means, comprising:

- a second microprocessor having fixed storage library read-only memory means separate from said first microprocessor means for providing a storage library permitting mathematical computations including at least arithmetic, trigonometric and logarithmic type computations;
- data and MACRO instruction input means coupled to said second microprocessor and responsive to said control information for initiating a desired mathematical computation;
- data output means coupled to said second microprocessor for providing results of said mathematical computation in the form of a plurality of digital signals representing digit position, digit data and control outputs;
- data and MACRO instruction receiving means coupled to said first microprocessor means for directly receiving both said MACRO instructions and data in the form of a plurality of digital signals from said first microprocessor means; and
- selection means coupled to said receiving means for selecting from said fixed storage library read-only memory means a specific portion of said storage library to execute the desired mathematical computation directly from said receiving means.

2. A number processor in accordance with claim 1 wherein said microprocessor having fixed storage library read-only memory means comprises a single integrated circuit chip.

3. A number processor in accordance with claim 1 wherein said microprocessor having fixed storage library read-only memory means comprises a single MOS integrated circuit chip.

4. A number processor in accordance with claim 1 wherein said fixed storage library read-only memory means comprises a semiconductor read-only memory.

5. A number processor in accordance with claim 1 wherein said fixed storage library read-only memory means comprises an MOS semiconductor read-only memory.

6. A number processor in accordance with claim 1 wherein said storage library permitting mathematical computations including at least arithmetic, trigonometric and logarithmic type computations comprises microprogram means for providing control and information processing.

7. A number processor in accordance with claim 1 wherein said data input means coupled to said first microprocessor means for initiating under external control a desired mathematical computation comprises input means for providing external MACRO instructions, data and control information.

8. A number processor in accordance with claim 1 wherein said data input means coupled to said first microprocessor means for initiating under external control a desired mathematical computation comprises combined input means for providing both external MACRO instructions and data and control.

9. A number processor in accordance with claim 1 wherein said selection means comprises microinstruction program means for providing instruction inputs, control inputs and control outputs.

* * * * *